US00RE47053E

(19) United States
(12) Reissued Patent
Drosset et al.

(10) Patent Number: US RE47,053 E
(45) Date of Reissued Patent: Sep. 18, 2018

(54) METHOD AND SYSTEM FOR SUBSCRIBER-BASED AUDIO SERVICE OVER A COMMUNICATION NETWORK

(75) Inventors: Joseph St-John Drosset, Queen Creek, AZ (US); Michael Kim, Naperville, IL (US); Christopher J. Bottorf, Chicago, IL (US); Juan C. McMillan, Glencoe, IL (US)

(73) Assignee: Benhov GMBH, LLC, Wilmington, DE (US)

(21) Appl. No.: 13/285,865

(22) Filed: Oct. 31, 2011

Related U.S. Patent Documents

Reissue of:
(64) Patent No.: 6,662,231
Issued: Dec. 9, 2003
Appl. No.: 09/608,270
Filed: Jun. 30, 2000

U.S. Applications:
(62) Division of application No. 11/299,241, filed on Dec. 9, 2005, which is an application for the reissue of Pat. No. 6,662,231.

(51) Int. Cl.
*G06F 15/16* (2006.01)
*H04N 21/482* (2011.01)
*G06F 17/30* (2006.01)

(52) U.S. Cl.
CPC ..... *H04N 21/4825* (2013.01); *G06F 17/3074* (2013.01); *G06F 17/30772* (2013.01)

(58) Field of Classification Search
CPC ..... G06F 17/3074; G06F 17/30772; H04N 21/4825

(Continued)

(56) References Cited

U.S. PATENT DOCUMENTS 5,191,573 A 3/1993 Hair ..... 369/84
5,675,734 A 10/1997 Hair ..... 709/219

(Continued)

FOREIGN PATENT DOCUMENTS

EP 0701371 3/1996
EP 0982732 3/2000

(Continued)

OTHER PUBLICATIONS

Deering, et al., "Internet Protocol, Version 6 (Ipv6)," Network Working Group, RFC-2460, Dec. 1998, pp. 1-28.

(Continued)

*Primary Examiner* — Ovidio Escalante
(74) *Attorney, Agent, or Firm* — Meyertons, Hood, Kivlin, Kowert & Goetzel, P.C.

(57) ABSTRACT

Disclosed is a method and system for providing audio service to a client through a communication network. A user subscribes to the service and the user's access to audio files is contingent upon authorization and validation. Once authorized, the user may access and stream out audio date files, or similar types of files, to the client device through the communication network. Metrics are maintained for the play-out of each audio file and payment may be allocated to an owner of rights in the audio file based on the play-out statistics. The user may maintain customized play lists on the server for playing out preselected audio files. A play list may be sent to another user. The server may also be configured to select audio files not previously selected by the user based on the user's past selection behavior or based on the user's stated preferences. The audio files identified by (Continued)

the server are then suggested to the user. The user may also be referred by the server to a sales site to purchase a recording of the audio file.

23 Claims, 16 Drawing Sheets

(58) Field of Classification Search
USPC ..... 709/201–203, 217–219, 227–229, 709/231–232, 245–247
See application file for complete search history.

(56) References Cited

U.S. PATENT DOCUMENTS

| | | | | |
|---|---|---|---|---|
| 5,721,583 | A * | 2/1998 | Harada et al. | 725/24 |
| 5,809,144 | A | 9/1998 | Sirbu et al. | 705/53 |
| 5,926,624 | A | 7/1999 | Katz et al. | 709/217 |
| 5,930,765 | A | 7/1999 | Martin | 709/231 |
| 5,963,916 | A | 10/1999 | Kaplan | 705/26 |
| 6,002,720 | A | 12/1999 | Yurt et al. | 375/240 |
| 6,005,563 | A | 12/1999 | White et al. | 345/718 |
| 6,226,618 | B1 | 5/2001 | Downs et al. | |
| 6,226,672 | B1 * | 5/2001 | DeMartin | G09B 7/04 709/219 |
| 6,248,946 | B1 * | 6/2001 | Dwek | G06F 17/30749 707/E17.101 |
| 6,327,346 | B1 * | 12/2001 | Infosino | 379/88.02 |
| 6,351,736 | B1 * | 2/2002 | Weisberg et al. | 705/14.46 |
| 6,407,750 | B1 * | 6/2002 | Gioscia et al. | 709/219 |
| 6,502,194 | B1 * | 12/2002 | Berman et al. | 709/231 |
| 6,546,427 | B1 | 4/2003 | Ehrlich et al. | |
| 6,549,942 | B1 * | 4/2003 | Janky et al. | 709/219 |
| 6,721,489 | B1 | 4/2004 | Benyamin et al. | |
| 6,769,028 | B1 | 7/2004 | Sass et al. | |
| 6,823,225 | B1 | 11/2004 | Sass | |
| 6,965,770 | B2 | 11/2005 | Walsh et al. | |
| 6,973,476 | B1 * | 12/2005 | Naden et al. | 709/203 |
| 7,010,572 | B1 * | 3/2006 | Benjamin | G06Q 10/107 709/203 |
| 7,054,921 | B2 * | 5/2006 | DeMartin et al. | 709/219 |
| 7,065,342 | B1 * | 6/2006 | Rolf | G06F 17/30749 455/185.1 |
| 7,113,999 | B2 | 9/2006 | Pestoni et al. | |
| 7,133,846 | B1 | 11/2006 | Ginter et al. | |
| 7,415,537 | B1 | 8/2008 | Maes | |
| 7,660,295 | B2 | 2/2010 | Allan et al. | |
| 2001/0025256 | A1 | 9/2001 | Oliphant et al. | |
| 2002/0010759 | A1 * | 1/2002 | Hitson | G06Q 30/02 709/219 |
| 2002/0013784 | A1 | 1/2002 | Swanson | |
| 2002/0032019 | A1 * | 3/2002 | Marks | G06F 17/30017 455/414.1 |
| 2003/0037157 | A1 | 2/2003 | Pestoni et al. | |
| 2003/0103607 | A1 | 6/2003 | Feakes | |
| 2004/0024688 | A1 | 2/2004 | Bi et al. | |
| 2005/0049002 | A1 * | 3/2005 | White | G06Q 30/0267 455/556.1 |
| 2009/0177742 | A1 | 7/2009 | Rhoads et al. | |
| 2011/0265135 | A1 * | 10/2011 | Liwerant et al. | 725/112 |
| 2012/0209962 | A1 * | 8/2012 | Eyal | G06F 17/30038 709/219 |

FOREIGN PATENT DOCUMENTS

| | | | |
|---|---|---|---|
| EP | 0982732 A1 | 3/2000 | G11C 7/00 |
| EP | 1548741 | 6/2005 | |
| EP | 1712977 | 10/2006 | |
| WO | 1999018518 | 4/1999 | |
| WO | WO 99/18518 | 4/1999 | G06F 17/00 |
| WO | 1999027681 | 6/1999 | |
| WO | 2002045316 | 6/2002 | |
| WO | 2003048948 | 6/2003 | |
| WO | 2004003879 | 1/2004 | |
| WO | 2006027660 | 3/2006 | |

OTHER PUBLICATIONS

Rigney, et al., "Remote Authentication Dial in User Service (RADIUS)," Network Working Group, RFC-2138, Apr. 1997, 47 pages.
Yeong, et al., "Lightweight Directory Access Protocol," Network Working Group, RFC-1777, Mar. 1995, 16 pages.
Janelle Brown, "Personalize me, baby," Salon.com: Technology and Business, Apr. 6, 2001, 7 pages.
Welcome to Moodlogic, Inc., home page, 2001, 1 page.
MediaUnbound, Inc., "AudioInsight," 2000, pp. 1-2.
TheStandard.com, "MTVi Makes Major-Label Download Deal," Apr. 4, 2001, pp. 1-3.
Kenneth Li and Ronna Abramson, "Yahoo to Offer Universal, Sony Downloads," TheStandard.com, Apr. 5, 2001, pp. 1-3.
U.S. Appl. No. 11/513,985, filed Aug. 31, 2006, 29 pages.
Official Action in U.S. Appl. No. 11/299,241 dated Sep. 27, 2006, 7 pages.
Official Action in U.S. Appl. No. 11/299,241 dated Apr. 16, 2009, 12 pages.
Official Action in U.S. Appl. No. 11/299,241 dated Jan. 7, 2010, 13 pages.
Official Action in U.S. Appl. No. 11/299,241 dated Mar. 2, 2011, 10 pages.
Office Action in U.S. Appl. No. 11/299,241 dated Jun. 28, 2012, 9 pages.
Final Office Action in U.S. Appl. No. 11/299,241 dated Oct. 25, 12 pages.
Office Action in U.S. Appl. No. 11/299,241 dated Mar. 13, 2013, 10 pages.
Deering et al., "*Internet Protocol, Version 6 (Ipv6)*", Network Working Group, RFC-2460, Dec. 1998, pp. 1-39.
Rigney et al., "*Remote Authentication Dial In User Service (RADIUS)*", Network Working Group, RFC-2138, Apr. 1997, pp. 1-65.
Yeong et al., "*Lightweight Directory Access Protocol*", Network Working Group, RFC-177, Mar. 1995, pp. 1-22.
Salon.com, "*Personalize me, baby*", Apr. 6, 2001, pp. 1-8.
TheStandard.com "*Yahoo to offer Universal, Sony Downloads*", Apr. 5, 2001, pp. 1-3.

* cited by examiner

USER DATA TABLE

| USER ID | USER PASSWORD | SUBSCRIBED | PLAYLIST1 | PLAYLIST2 | USER DEMO-GRAPHICS |
|---|---|---|---|---|---|
| ALPHA-NUMERIC | ALPHA-NUMERIC | BOOLEAN | POINTER | POINTER | POINTER |
| ALPHA-NUMERIC | ALPHA-NUMERIC | BOOLEAN | POINTER | POINTER | POINTER |
| ALPHA-NUMERIC | ALPHA-NUMERIC | BOOLEAN | POINTER | POINTER | POINTER |

FIGURE 2

| | |
|---|---|
| AGE | INTEGER |
| GENDER | M/F |
| PROFESSION | ALPHA-NUMERIC |
| CATEGORIES | POINTER |
| SELECTIONS | POINTER |

FIGURE 3

| | |
|---|---|
| USER ID | ALPHA-NUMERIC |
| DURATION | INTEGER |

FIGURE 5

AUDIO FILE TABLE

| AUDIO ID | PLAY COUNT | PLAY-OUT TIME | OWNER ID | REFER LINK | REFER COUNT | AUDIO DATA | PLAY DATA | CATEGORY |
|---|---|---|---|---|---|---|---|---|
| ALPHA-NUMERIC | INTEGER | INTEGER | ALPHA-NUMERIC | URL | INTEGER | POINTER | POINTER | ALPHA-NUMERIC |
| ALPHA-NUMERIC | INTEGER | INTEGER | ALPHA-NUMERIC | URL | INTEGER | POINTER | POINTER | ALPHA-NUMERIC |
| ALPHA-NUMERIC | INTEGER | INTEGER | ALPHA-NUMERIC | URL | INTEGER | POINTER | POINTER | ALPHA-NUMERIC |
| ALPHA-NUMERIC | INTEGER | INTEGER | ALPHA-NUMERIC | URL | INTEGER | POINTER | POINTER | ALPHA-NUMERIC |

*FIGURE 4*

METHOD AND SYSTEM FOR SUBSCRIBER-BASED AUDIO SERVICE OVER A COMMUNICATION NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 6,662,231. The reissue applications are U.S. application Ser. No. 11/299,241, filed Dec. 9, 2005; U.S. application Ser. No. 11/513,985, filed Aug. 31, 2006, which is a continuation of U.S. application Ser. No. 11/299,241; and the present reissue application, which is a divisional of U.S. application Ser. No. 11/299,241.*

FIELD OF THE INVENTION

The present invention relates to audio data communications. More specifically, it relates to customized audio service to a user over a communications link through communication network.

DESCRIPTION OF THE RELATED ART

Digital audio services are increasingly available to users through a variety of sources. In these services, audio data files, such as MP3 files, are stored in a server and streamed or downloaded on demand to users over connections through a wide area network, such as the Internet or the Web.

Often, these services are used to download audio files which are then stored and disseminated to other users in violation of the rights of the owners of the audio files. Also, these services typically only provide users with the selections that the user himself identifies.

Other services, such as internet radio stations, typically provide music to user in a manner consistent with the rights of the owners of the audio files. This is typically accomplished by paying royalties to the owners based on the playlist of the station. However, the music provided by the station is chosen by a programming director or service.

Consequently, an improved method for delivering music to users is desired that protects the rights of the owners of the music.

BRIEF DESCRIPTION OF THE DRAWINGS

The present invention is described below in the context of several embodiments of the invention with reference to the following drawings, wherein like reference numerals refer to like elements in the various figures, and wherein:

FIG. 2 is functional block diagram illustrating an embodiment of a data structure for use of the present invention;

FIG. 3 is a functional block diagram illustrating an embodiment of a data structure for representing user demographics of the present invention;

FIG. 4 is a functional block diagram of a data structure for an Audio File Table according to the present invention;

FIG. 5 is a functional block diagram illustrating a data structure restoring play-out data according to the present invention;

DETAILED DESCRIPTION OF THE PRESENT INVENTION

The present invention is directed toward a subscriber-based service for providing audio files to a client device connected to a server through a network, such as a wide area network. The server has access to user data and audio data files stored in a memory system, such as a database. A user requesting service from the server is validated to ensure that the user is a subscriber. The user may then request streaming or download of audio data files or customized playlists from the server. Metrics for play-out of each audio file, such as duration of play-out or number of play-outs, are maintained for the audio files and used to allocate payment of royalties or license fees to owners of rights in the audio files, such as copyrights or phonograph rights. The user may also maintain and modify customized playlists through the server and send playlists to other users.

The method and system according to the present invention provides users with opportunities to search, listen, manage, and purchase their favorite music in the environment provided by the present invention. Examples of the types of users that may interact with the present invention include customers, ad scheduling operations personnel, and program or music scheduling operations personnel.

Figure 1:
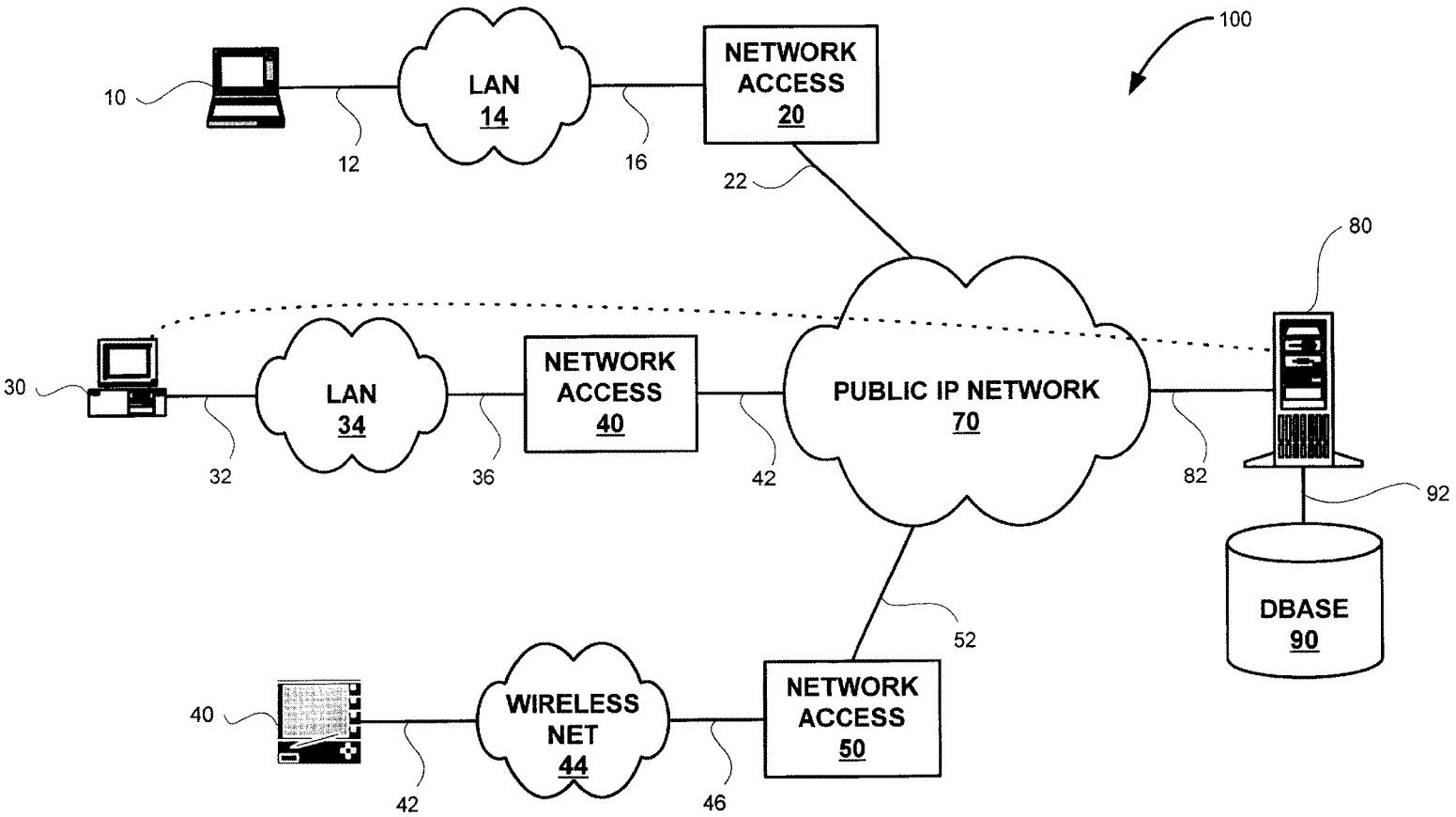
FIG. 1 is a functional block diagram of several embodiments suitable for application of the present invention.

FIG. 1 illustrates an embodiment of an architecture suitable for use in the present invention. Laptop computer 10 is a client device connected to Local Area Network (LAN) 14 through communication link 12. LAN 14 is linked to Network Access Server 20 through communication link 16, and Network Access Server 20, in turn, is connected to Public Internet Protocol (IP) Network 70 through communication link 22.

Client device 30, which, in this example, is a personal computer, is connected to LAN 34 through communication link 32. LAN 34 is connected to Network Access Server 40 through communication link 36. Network Access Server 40 is connected to Public IP Network 70 through communication link 42.

And in yet another example of a client device and network configuration suitable for use in the present invention, client device 40 is a dedicated wireless hardware device that is connected to a wireless network 44, such as a cellular network, satellite network, or wireless LAN, through wireless communication link 42. Wireless network 44, in turn, is connected to Network Access Server 50 through communication link 46. Network Access Server 50 is connected to Public IP Network 70 through communication link 52. Server 80 is connected to Public IP Network through communication link 82 and is capable of communicating with each of client devices 10, 30 and 40 through its respective network access. Server 80 is also on communication with Database 90 through communication link 92.

The architecture of FIG. 1 illustrates a variety of client devices and network configurations suitable for use according to the present invention. The client devices may include dedicated audio file devices, such as MP3 readers, or more generalized devices with audio capability, such as personal computers, personal data assistants, or laptop computers, that may be equipped with sound cards or similar equipment that permit an audio signal to be generated in response to an audio data file. Radio-frequency enabled devices, such as cell phones, automobile-based communication devices, or more general computing devices with wireless communication equipment, may also be used in accordance with the present invention.

Public IP network 70 is one example of a wide area network (WAN) suitable for use with the present invention. The user of other types of network is possible, including wireless networks. The Internet Protocol is defined in Request For Comment (RFC) 2460, and its predecessor documents, available through the Internet Engineering Task Force (IETF) at www.ietf.org, and herein incorporated by reference in its entirety for all purposes.

Each server type in the figure represents a logical server or server cluster or server farm in the architecture and is not limited to an individual physical server. The server site may be deployed as a server farm or server cluster managed by the service hosting provider. For this reason, it may be useful not to hold any user states from one http request to the next in the server site or in a web server. The database server may be deployed as a server cluster. This configuration may be replicated as the capacity requirements for the system dictate. Any data updated through an administrative interface, through a system intranet, or by daemon process may be configured as a master-slave configuration in a replicated environment simplifying the replication strategy. The user updated information through the web site may also be configured as a multi-master configuration in a replicated environment.

FIG. 2 is an embodiment of a data structure residing in database 90 of FIG. 1. FIG. 2 is a user data table that is populated to identify users that are subscribed to an audio service provided by server 80 of FIG. 1. The user data table in FIG. 2 includes an alphanumeric User ID for identifying the user, an alphanumeric User Password to validate the subscriber, a Subscribed boolean value that indicates that the user is subscribed to the service, a first Play List pointer and a second Play List pointer that may each point to a location in memory for a play list defined by the user or another source, and a User Demographics pointer that points to a data record containing demographic data for the User IDentified by the User ID. Other data structures, such as a table or array, may also be used for storage of this information.

FIG. 3 is an example of a data structure according to the present invention for storing the user demographic data pointed to by the user demographics pointer of the user data table of FIG. 2. The record shown in FIG. 3 will typically be part of a list of such records pointed to by the user demographics pointer. Other data structures, such as a table or array, may also be used for storage of this information. Also note that the record of FIG. 3 may be composed of a variety of data entries and those shown are merely exemplary. In addition to the age, gender, profession, categories and selections fields, a location field may be added to indicate the location for login by the user, the connection rate for the client-server connection, the income level of the user and the user's postal code. One of ordinary skill in the art will readily appreciate that other data structures and information fields may be employed in accordance with the desired design without departing from the teachings of the present invention.

FIG. 4 is an embodiment of a data structure containing data for a plurality of audio files in the form of an Audio File Table. The Audio File Table in FIG. 4 contains an alphanumeric Audio ID for uniquely identifying each entry in the Audio File Table. Examples of protocols suitable for use, in whole or in part, as the Audio ID are the MP3ext protocol and the ID3 protocol described further at www.id3.org and incorporated by reference herein.

For each Audio File Table, the table includes a Play Count indicating the number of times that the audio file has been played out to a user, a Play-out Time value that indicates the duration of time that the audio file has been played out, an alphanumeric Owner ID to identify the owner of the audio file, a Referral Link containing a universal resource locator (URL) indicating a sales site for the audio file, and a Referral Count value indicating the number of times that a user has been referred to the sales site of the referral link. Further information regarding URLs is available through the IETF at www.ietf.org.

The table in FIG. 4 also includes an Audio Data pointer that indicates the actual location of the digital codes of the audio file itself. The digital codes may be MPEG 3 (MP3) codes or similar data encoding methods. See the International Organisation for Standardisation (ISO) for further information relating to the Motion Picture Engineering Group (MPEG) standards for coding of moving pictures and associated audio for digital storage media at www.cselt.it/mpeg/standards.

The Audio File Table also includes a Play Data pointer that points to the beginning of a list and memory of database 90 that contains a record for each user access of the audio file. One or more alphanumeric Category columns in the Audio File Table identify a category for the audio file and may indicate a type, genre, era, artist, or similar identifying information for the audio file. Multiple category columns may be used to associate the audio file within multiple categories, such as multiple genres, e.g. alternative rock and folk, or in both a genre and an era, e.g. rock and 80's music. Other data structures, such as a linked-list of records or an array, may also be used for storage of the audio file information.

FIG. 5 is an example of a data structure for storing the play data pointed to by the Play Data pointer of the Audio File Table in FIG. 4. The data record of FIG. 5 includes a User ID identifying the user that requested the play-out and a duration field indicating the length of the play-out by the user. Other data structures may also be suitable for storage of this information. Alternatively, the record of FIG. 5 may have a pointer that links the record to the audio file table of FIG. 4. One of ordinary skill in the art will readily appreciate that there is a vast number of different approaches to organizing the data used in accordance with the present invention and, consequently, a large variety of different data structures are suitable for use with the present invention.

Figure 6:
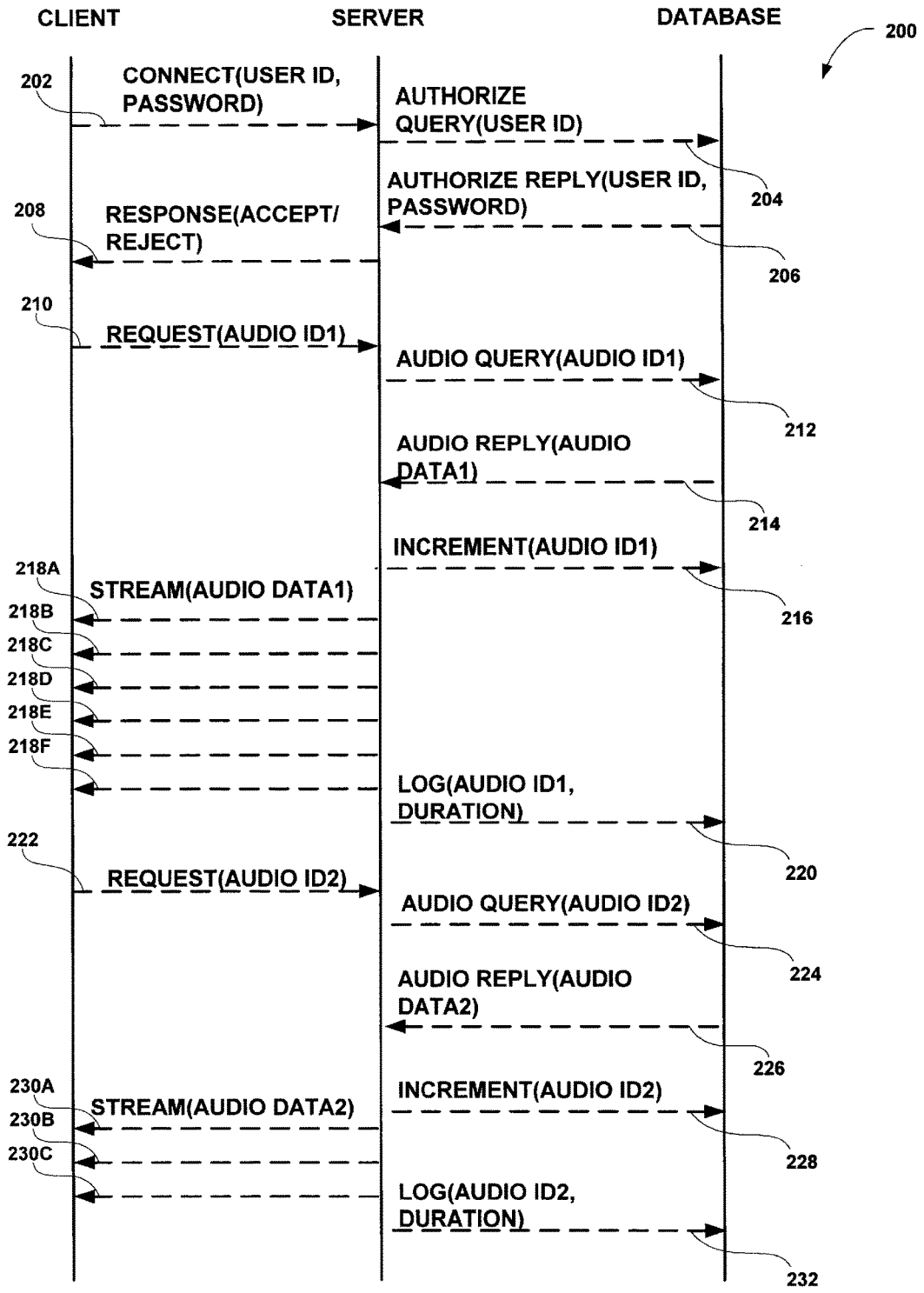
FIG. 6 is a message flow diagram according to one embodiment of the present invention as applied to the architecture of FIG. 1.

FIG. 6 is a message flow diagram illustrating an embodiment of the message exchange between the client server and database of FIG. 1. The client device initially sends a connect message 202 that contains a User ID and password value to the server. Using the User ID value, the server queries the database in message 204. Database 90 searches the user data table of FIG. 2 to find a match on the User ID value provided in message 204. The database provides the results of the search of the user data table to the server 80 in message 206, which is an authorization reply containing the User ID and a password value. Server 80 compares the password value provided in message 206 with the password value provided in message 202 from the client. Based on the comparison, server 80 either accepts or rejects the connection request from the client in message 208. An example of an established authentication protocol suitable for verifying a user of a client device is the RADIUS protocol discussed in Request For Comment (RFC) 2138, herein incorporated by reference. Other examples of authentication techniques that may be adapted for use with the present invention include Challenge-Handshake Authentication Protocol (CHAP), Password Authentication Protocol (PAP), digital certificates, Directory Access Protocol (DAP), and Lightweight Directory Access Protocol (LDAP). See RFC 1777 and the ITU-T X.500 standard for further information regarding DAP and LDAP. One of ordinary skill in the art will readily appreciate that there are a variety of approaches that may be suitable for use in validating a user in accordance with the present invention.

Preceding on the presumption that the connection request was accepted in message 208, the client may send an audio request message 210 containing an Audio ID value Audio ID1 that is received by server 80. The server then queries database 90 using an audio query message 212 containing the Audio ID value Audio ID1. Database 90 searches the Audio File Table of FIG. 4 for a match on the Audio ID value Audio ID1 and, using the audio data pointer from the Audio File Table, retrieves the audio data for the audio file and forwards it to the server in message 214. Server 80 sends an increment a, message 216 contained in the audio value Audio ID1, which causes the play count value of Audio File Table of FIG. 4 to be incremented for the Audio ID value. Server 80 also begins to stream out the audio data to the client device in a series of packets 218A-F, which the client device converts into audio outputs of the user. In one embodiment of the invention, server 80 sends a log message 220 containing the Audio ID value Audio ID1 a and a duration of the streaming out of the audio value for Audio ID value 1, which causes the play-out time value in the Audio File Table of FIG. 4 for the Audio ID value to be increased by the duration value. The user may continue to request play-out of audio files by submitting additional request messages such as request message 222 containing Audio ID value 2, which is processed in a manner similar to the processing of Audio ID file 1 as described above.

Examples of streaming audio software applications that may be adapted for use with the present invention are Microsoft Media Services, Quicktime, and ReaLPlayer. Streaming audio applications typically sent an audio file in a series of packets that include parts of the song stored in the audio file. The streaming application typically only stores a few seconds of an audio sequence in order to account for network or system latency. Since only a small portion of the audio file is typically resident in the client device, streaming applications present less opportunity for a user to copy and disseminate an audio file, thereby affording greater protection to the owner of the audio file.

Figure 7:
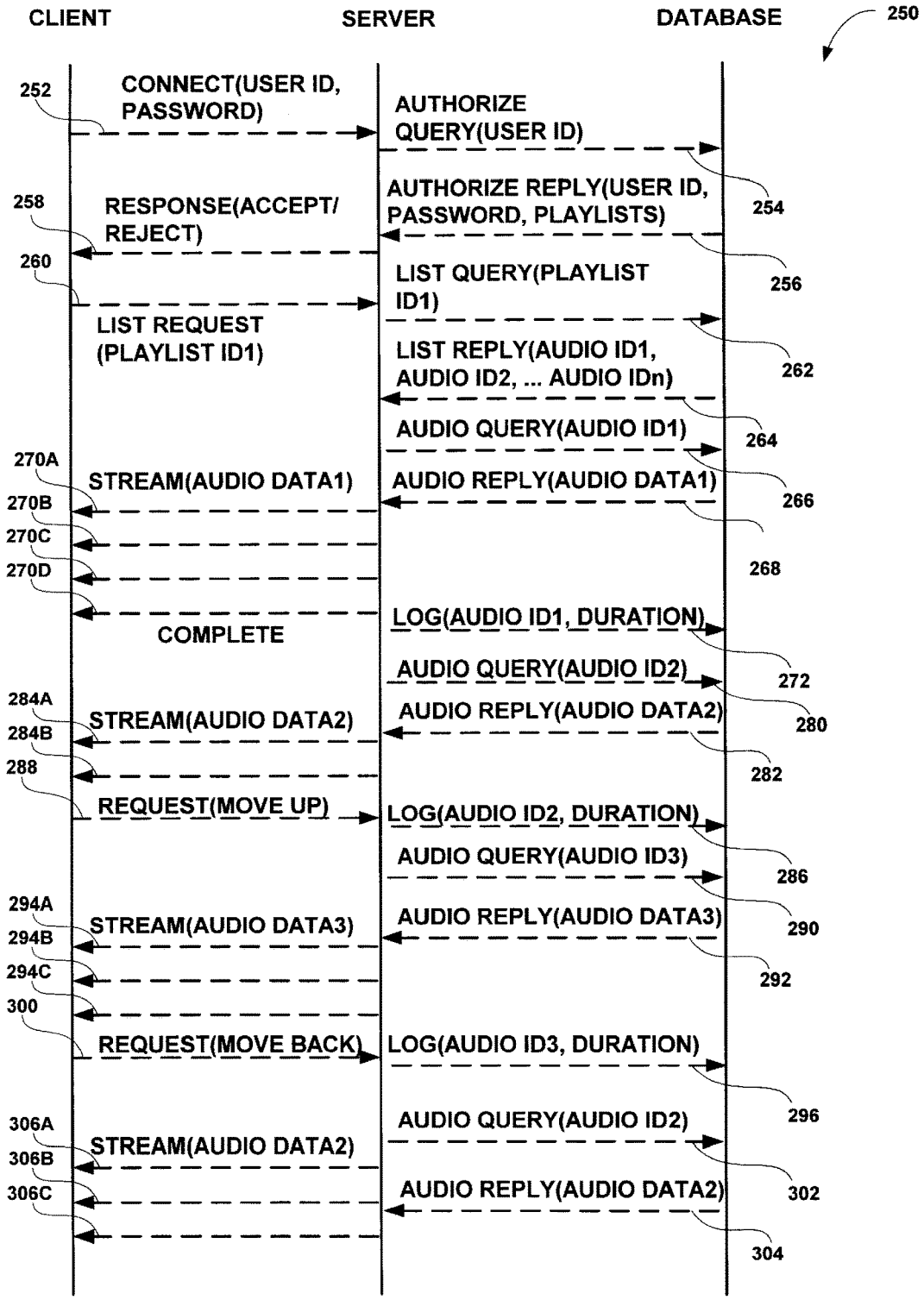
FIG. 7 is a message flow diagram of another embodiment of a message exchange according to the present invention.

FIG. 7 is a message sequence diagram illustrating an example of a message exchange 250 between the client server and database of FIG. 1, wherein the user accesses a play list stored in the user data table of FIG. 2. In message sequence 250, authorized reply message 256 in response to an authorized query of the users ID, not only includes the password, but includes the play list options obtained from the user data table of FIG. 2. The play list options are included in the response message 256 to the user of the client. The user selects a play list from the play list options and includes that in a list request message 260 to the server 80.

Server 80, using the Play List ID received in message 260, sends a list query message 262 to database 90. Responsive to the Play List ID value in list query 262, database 90 obtains the pointer from the user data table of FIG. 2 responding to the Play List ID and retrieves the Audio ID values from the play list for incorporation in the list reply message 264 to server 80. Server 80 then begins to play the audio files of the play list selected by the user in message 262 by sending an audio query 266 containing the first Audio ID value to database 90, which retrieves the audio data for the Audio ID value and incorporates it into audio reply message 268 to server 80.

Server 80 then proceeds to stream out audio data file 1 to the client device in a sequence of packets 270A-270D, until play-out of the audio file is complete. Server 80 then logs the duration of the play-out of the first audio file and proceeds to query the database 90 for the second audio file in the play list. Database 90 searches for the audio data file corresponding to the Audio ID value provided in audio query 280 and returns it to the server for play-out to the client device. The user may advance to the play list by requesting a move-up in the play list in message 288 to server 80.

Responsive to message 288, server 80 logs the duration of the play-out of the second audio file in message 286 to database 90 and queries the database for the next audio file in the play list in message 290. Database 90 replies with the audio data for the third audio file on the list which is included in message 292 to the server 80, which then proceeds to stream out the third audio data file in a sequence of packets 294A-C. The user may request repeat of songs on the play list by sending a move back message 300 to server 80 which will halt streaming of the third audio data file and log duration of the play-out of the third audio file in message 296. Server 80 then queries database 90 for the second audio file in message 302, database 90 retrieves the audio file and returns it to server 80 in message 304, and server 80 proceeds with a repeat of the play-out of audio data file 2 in sequence of packets 306A-C.

The present invention enables a user to create, modify or delete a playlist, where the user selects the audio files or controls the mix of audio files contained within the playlist. A user may begin creation of a playlist by selecting an icon, such as an icon on a graphical user interface or portion of an HTML page, representing a playlist creation function. The user may be then be prompted to select songs to place in the list.

There are many different ways that a user can search for and find music to populate a playlist according to the present invention. For example, a user may add to a playlist a song that is currently being streamed out to the user. To begin, a user clicks on an icon in order to create new playlist or select an existing one. A window appears at the user interface prompting the user to name the playlist. The user's selection is turned into a playlist ID and entered into a data entry for the user or, if it already exists, retrieved from the data entry. The user then clicks on another icon to select the song that is currently playing and the server adds the audio ID for the song to the selected playlist.

Likewise, a user can click on an icon for a song that is offered through a feature window presented at the user interface. The song may begin to play-out and the user is prompted to add the song to a playlist. If the user chooses to add the song, then the user is prompted for a playlist name. The system then adds the audio ID for the song to the identified playlist.

Alternatively, a user can review playlists, such as albums or predetermined mixes of audio tracks, defined by a service provider operating the server or by another user and select songs. The user reviews a playlist presented in a window of the user interface and clicks on an icon for a song in the playlist. In a manner similar to that described above, the song may begin to play-out and the user is prompted to add the song to a playlist. If the user chooses to add the song, then the user is prompted for a playlist name. The system then adds the audio ID for the song to the identified playlist.

The user may also search for songs to add to the playlist. The user interface may, for example, include a search interface presented through a window of the user interface or as part of an HTML page. To search, the user enters text into a search box. For example, the user may enter the name of an artist. The system according to the present invention will then search for all audio tracks or albums for that artist and display the search results to the user through the user interface. The user may then select a song or an album, which will begin to play. The user may then click on an icon to add the song to a playlist. The user is prompted to identify a playlist, such as by entering a name for the list or clicking on an icon for the list, and the audio ID for the song is added to the playlist.

Similarly, a user may search for music by song title, album title, and musical style or genre. These choices may be entered by the user as text or may be presented to the user through pull-down menus or icons that the user may click on.

Figure 8:
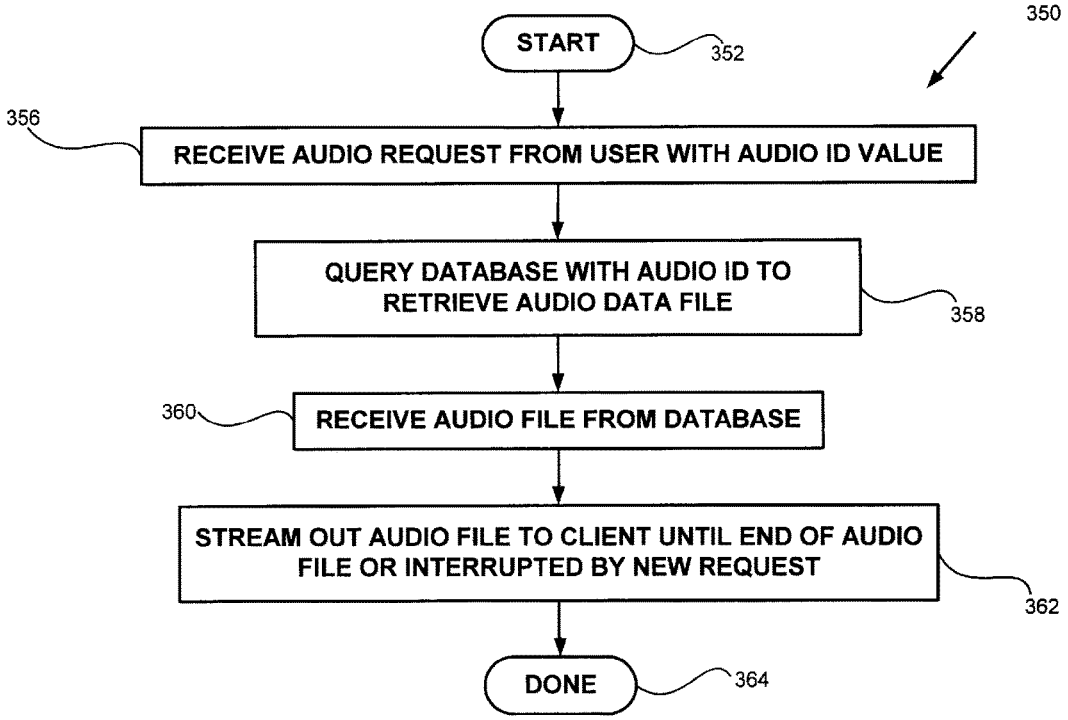
FIG. 8 is a control flow diagram of an embodiment of the processing taking place in the server of FIG. 1.

FIG. 8 is a control flow diagram of an embodiment of a process executing within server 80 for processing audio requests from the client device. Server 80 enters process 350 as step 352 and proceeds to step 356, at which the server receives an audio request from the user within an Audio ID value. Server 80 then queries database 90 with the Audio ID from the message received in step 356 in order to retrieve the audio data file for the Audio ID as step 358. As step 360, server 80 receives the audio file from database 90 and, at step 362, proceeds to stream out the audio file to the client until either the end of the audio file is encountered or the streaming out is interrupted by a new request from the client device.

Figure 9:
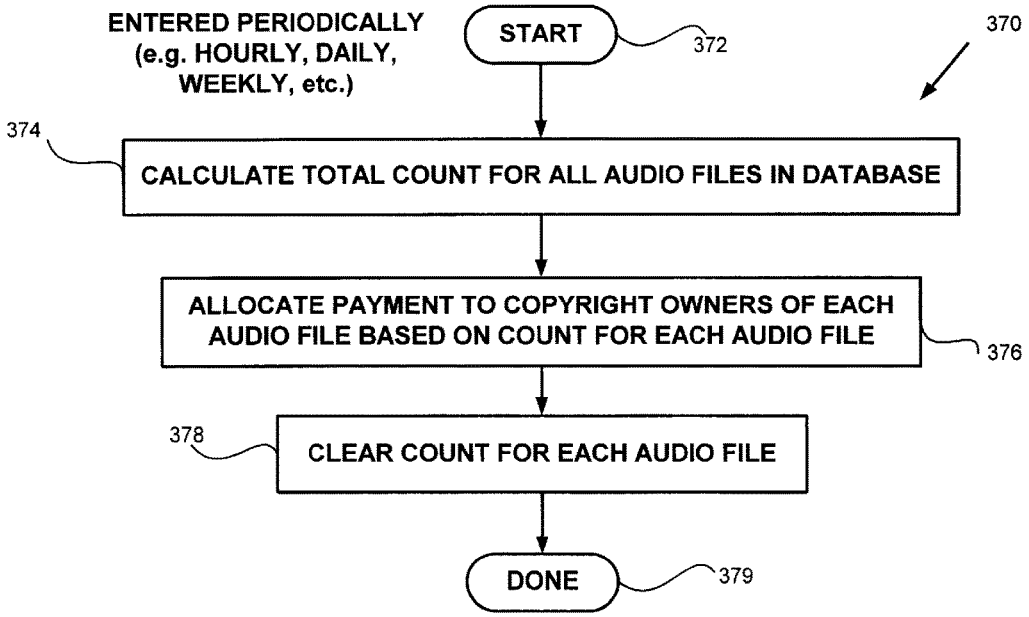
FIG. 9 is a control flow diagram illustrating an embodiment of a periodic process taking place in the server of FIG. 1 according to the present invention.

FIG. 9 is a control flow diagram of an embodiment of a process according to the present invention for allocation of payment to the owners of each of the audio files in the audio table of FIG. 4. Process 370 is entered at step 372 on a periodic basis, for example, hourly, daily or weekly. At step 374, the total play-out count for all audio files in the database 90 is calculated. Payment is then allocated at step 376 to each of the copyright owners of the audio files based on the count for each audio file. The audio file owners are identified by the Owner ID alphanumeric value in the Audio File Table of FIG. 4. Once the total count has been used to allocate payment to the all the copyright owners at step 376, the play count in the Audio File Table of FIG. 4 is cleared for each audio file in order to allow the process to begin again.

Figure 10:
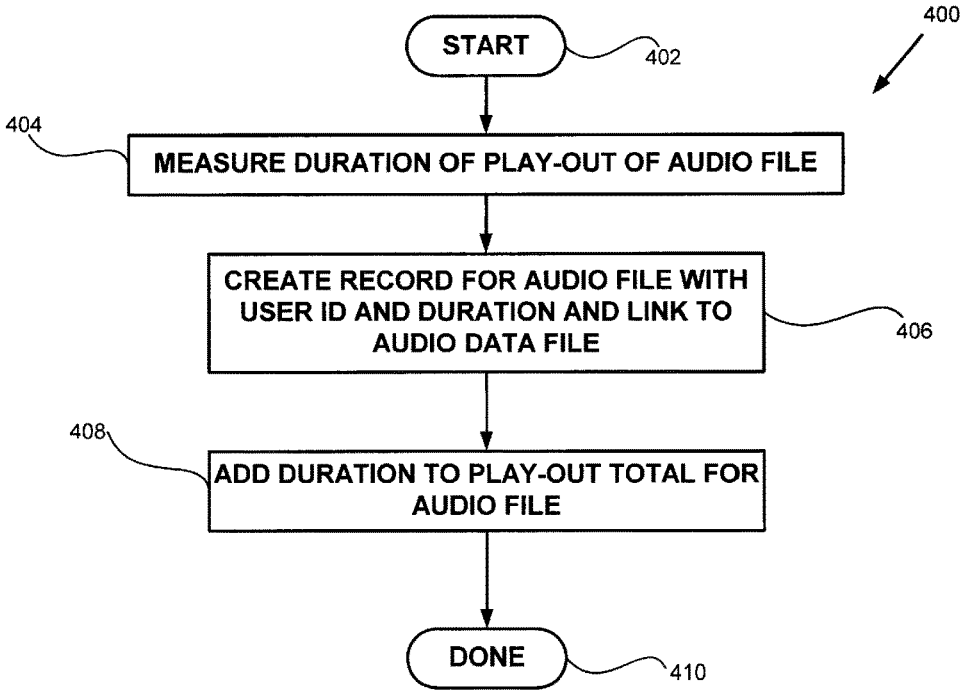
FIG. 10 is a control flow diagram illustrating an embodiment of a process for measuring duration of play-out of an audio file according to the present invention.

FIG. 10 is a control flow diagram illustrating another process 400 according to the present invention for measuring play-out of audio files. In process 400, the duration of play-out of each audio file is measured. Process 400 is entered when play-out of a file begins and the duration of play-out is measured for example in seconds at 404. At step 406, a record is created for the audio file that indicates the User ID for the user receiving the file and the duration of play-out of the file. An example of such an audio file record is indicated in FIG. 5 as discussed above and is linked to the audio data file using an audio data pointer to indicate a list for the audio file. Note that measurement of play-out may be accomplished in a variety of ways. For example, duration of play-out may be measured in the client device or in one of a number of servers, such as a streaming server dedicated to streaming out the audio data.

Figure 11:
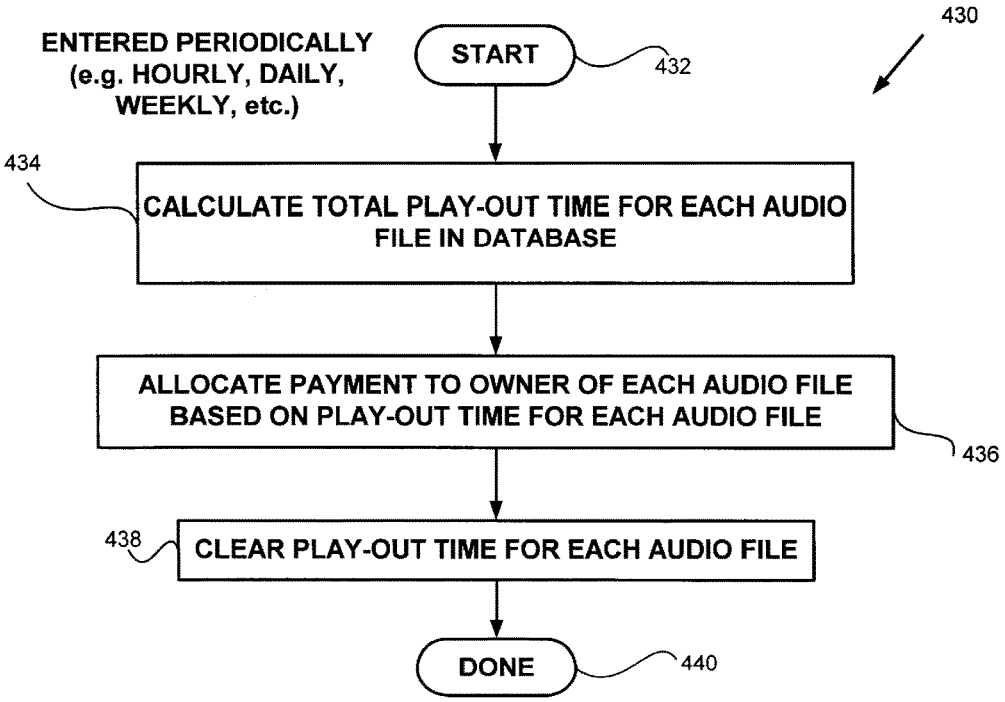
FIG. 11 is a control flow diagram of a process according to the present invention for allocating pay-out for an owner of an audio file based on play-out time for each audio file.

FIG. 11 is a control flow diagram indicating an embodiment of a process 430 for allocating payment to the owners of each audio file based on the duration of play-out of the audio files. Process 430 is entered periodically, e.g., hourly, daily, weekly, etc., and, at step 434, the play-out time for each audio file in the data base is calculated using the play-out time column in the Audio File Table of FIG. 4. Payment is then allocated to the owners of each audio file, as indicated by the Owner ID value in the Audio File Table, based on the play-out time for each audio file, at step 436. At step 438, the play-out time column of the Audio File Table of FIG. 4 is cleared in preparation for a new measurement.

Figure 12:
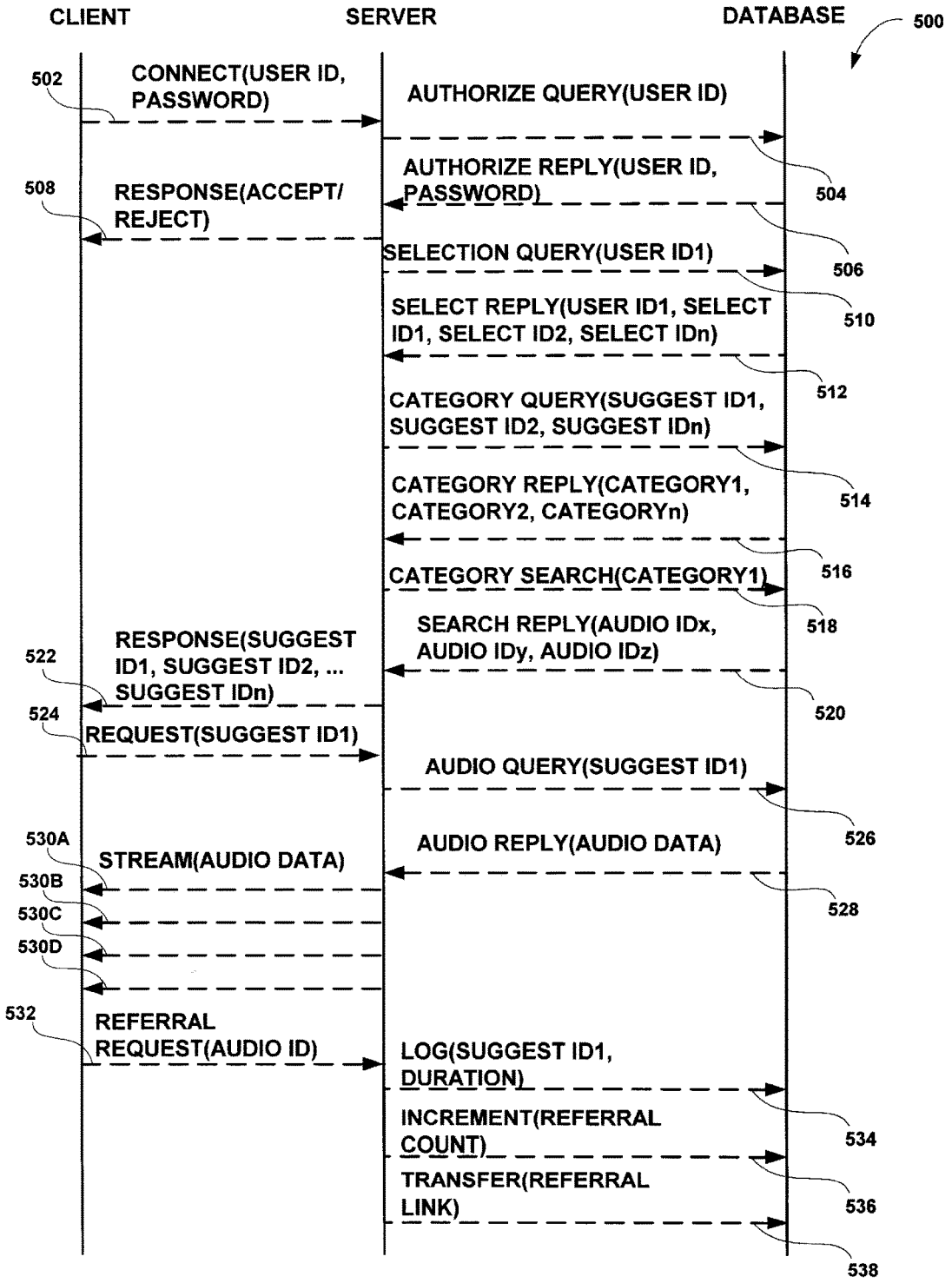
FIG. 12 is a message flow diagram illustrating an embodiment of a message exchange according to the present invention for suggesting additional suggestions to a user.

FIG. 12 is a message exchange diagram illustrating an exchange of messages 500 among the client, server and database at FIG. 1 for suggestion of alternative suggestions to a user of the client device. After validation of the user, server 80 queries database 90 using the User ID value in message 510 to obtain the past selections made by the user identified by the User ID value. In one embodiment, database 90 searches for past selections made by the user researching for the records shown in FIG. 5 that are connected to the Audio File Table of FIG. 4, and returns the selection IDs for the audio files to the server 80 in a select reply message 512. Server 80 then uses the audio file identifiers returned in message 512 to submit a category query 514 to the database 90. Database 90 responds to the category query and the audio file IDs by retrieving the category values for each of the audio files. Server 80 then selects a category, in this case category 1, and submits a category search 518 to database 90, which responds with a search reply message 520 containing a list of Audio ID values having matching category values to the category 1 of message 518. Server 80 then compares the Audio ID values returned in message 520 with the Audio ID values returned in the selection reply message 512 and identifies one or more Audio ID values in the category that have not been selected in the past by the user. The server then sends these Audio ID values as suggested ID values in a response message 522 to the client device. The suggestions are displayed to the user who selects a suggested ID, in this case suggestion ID1, that is submitted in an audio request 520 for the server 80, which sends a query 526 to database 90 containing the suggestion ID value.

Database 90 replies with the audio data file corresponding to the suggestion ID value and which is incorporated into audio reply message 528. Server 80 then streams out the audio data from audio reply message 528 to the client device. In one embodiment of the present invention, the user requests referral by sending a referral request message 532 containing the Audio ID value from the suggestion ID that was previously submitted in request 524. Server 80 logs the play-out of the suggestion track by sending message 534 that includes the audio file ID of the suggested track and the duration of play-out. Server 80 then increments the referral count value in the Audio File Table of FIG. 4 using message 536 and transfers the user to the referral link value by sending message 538, which will then cause client device to be transferred to the site indicated by the URL of the referral link.

Note that the a suggested song can be added to a playlist by the user. For example, while the song is playing, the user can click on an icon on the user interface for adding the suggested song to a playlist. The user is prompted to identify a playlist. The system then adds the audio ID for the song to the identified playlist for the user. This information is stored and may be subsequently retrieved.

Figure 13:
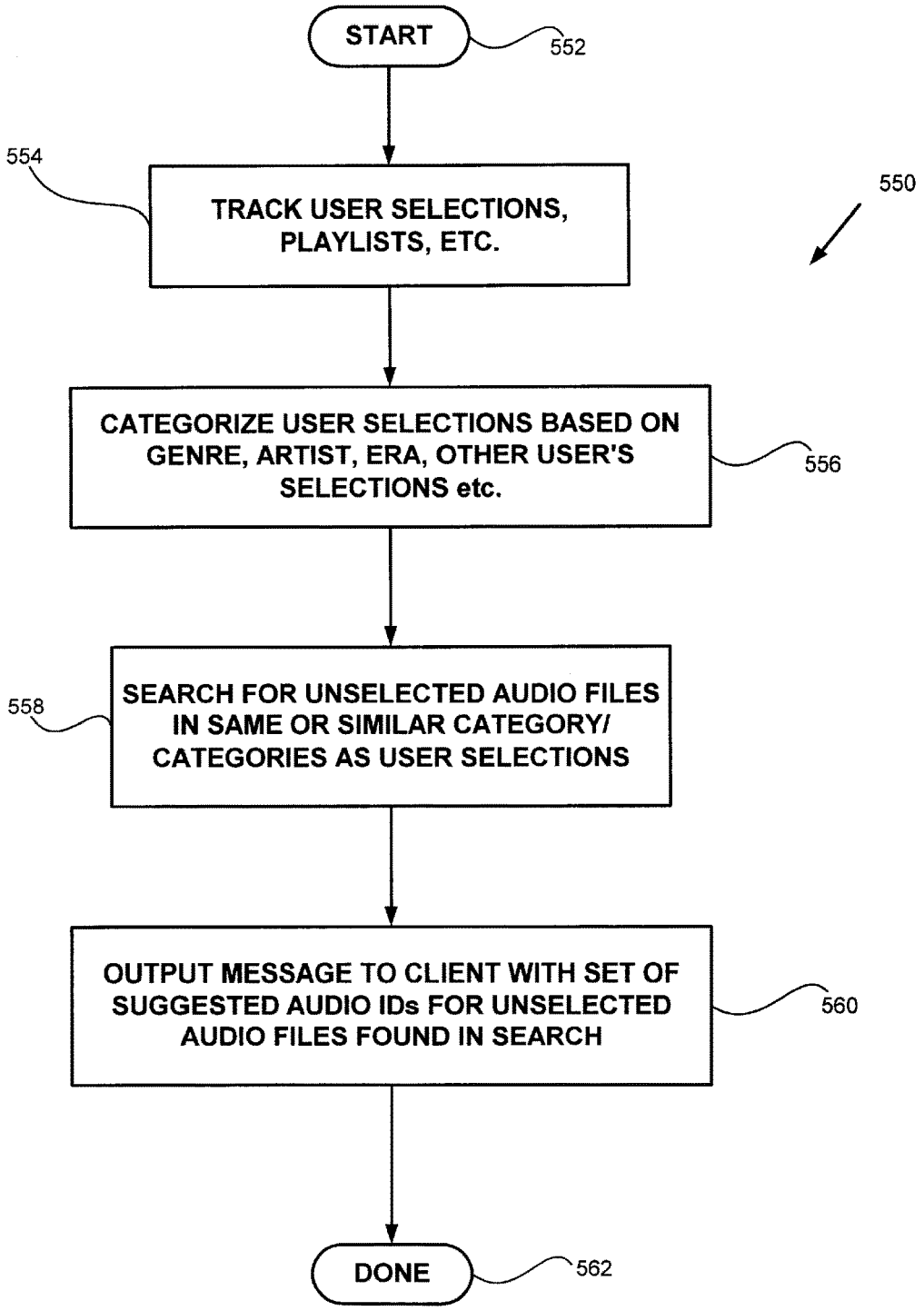
FIG. 13 is a control flow diagram illustrating an embodiment of a process according to the present invention in the server of FIG. 1 for identifying suggested audio files for a user.
Figure 14:
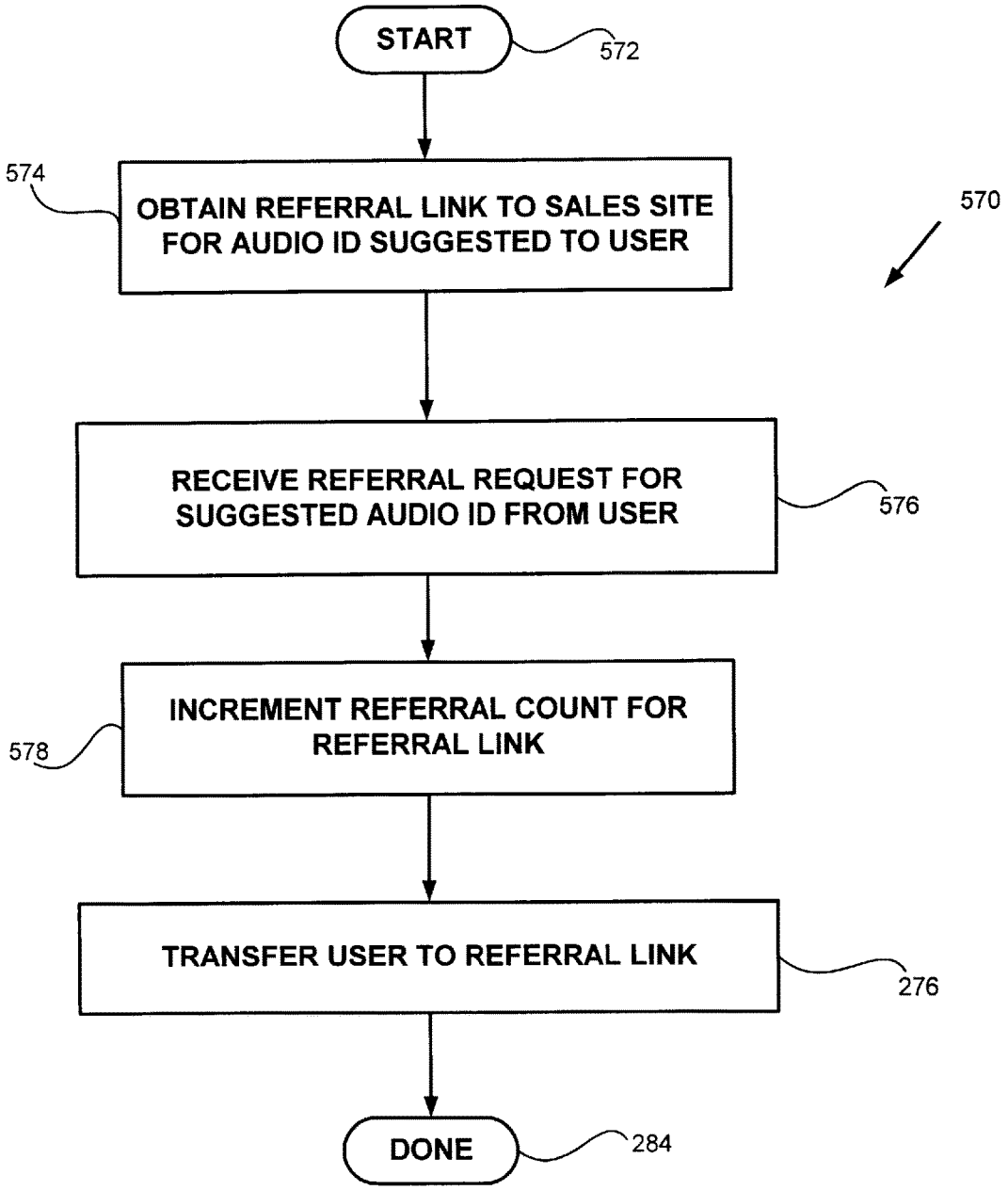
FIG. 14 is a control flow diagram illustrating an embodiment of a process according to the present invention for handling referral of the user to a sales site.

FIG. 13 is a control flow diagram of an embodiment of a process 550 for identifying suggestion tracks for the user. Process 550 may be entered at various points including log-in and validation of the user as identified above. At step 554, server 80 tracks the users selections as well as play lists and other information relating to the user's tastes and interests. This may be performed either through the search of the records shown in FIG. 5 or through a list of user selections attached to the user's entry in the user data table of FIG. 2. At step 556, the user selections are categorized. This categorization may be based on genre, artist, era or similar data and may make reference to other user selections who have similar tastes. Processing them proceeds to step 558 where server 80 searches for unselected audio files in the same or similar categories as the user selections that have been tracked in the past or may be found in play-lists or in other user selections having similar tastes. At step 560, a message is output to the client with suggested Audio IDs from selected audio files that were found in the search at step 558. In this manner, a user is exposed to additional unselected audio files that may be of interest to the user but which the user is unaware of FIG. 14 is a control flow diagram of a process 570 according to the present invention for referring a user to a sales site for sales related to an audio file. In process 570, server 80 obtains a referral link related to an audio file, at step 574, that indicates a sale site where the audio file or the music related to the audio file may be purchased by the user. The referral link is typically a universal resource locator (URL) that identifies the site such as www.amazon.com that provides sales of audio recordings. At step 576, server 80 receives the referral request from the user for suggested Audio ID. Responsive to the referral request, server 80 increments the referral count for referral link in the Audio File Table of FIG. 4, at step 578 and, at step 276, transfers the user to the referral link.

Figure 15:
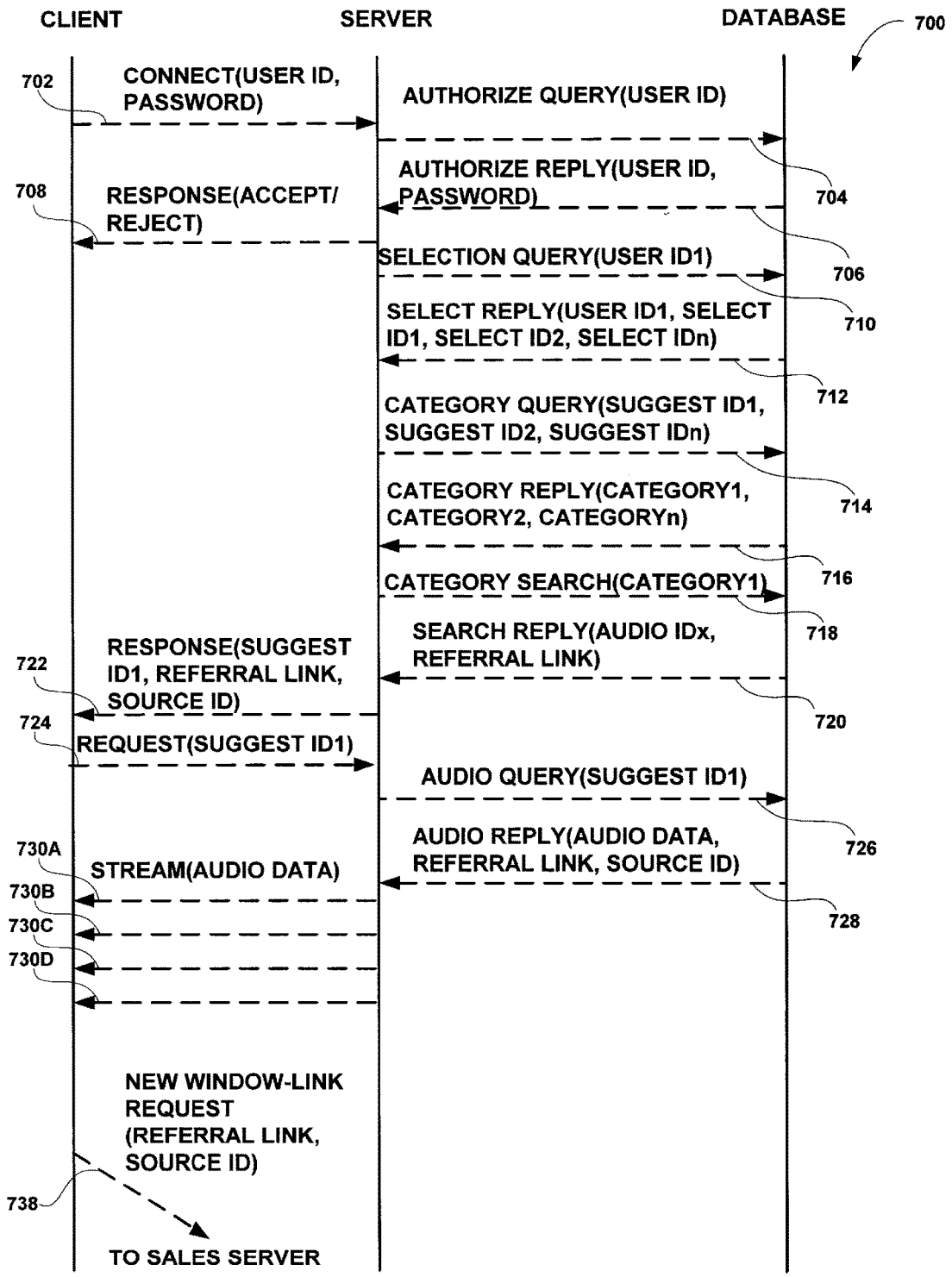
FIG. 15 is a message sequence diagram illustrating an embodiment of an exchange of messages in the architecture of FIG. 1 for suggesting alternative audio file selections to a user and tracking the source of sales referral for the audio file ID.

FIG. 15 is a message sequence diagram of a sequence 700 according to the present invention for providing suggestions to a user of a client device and tracking referrals to a sales site for sales of the audio file. Sequence 700 proceeds in a manner similar to that of sequence 500 of FIG. 12. However, the response to category search 718 with a category value will include the referral link values in the search reply message 720 for each audio file. Server 80 then returns in its response 722 the suggested track audio file ID, the referral link, and a source ID that identifies server 80 as the source of the referral. The client subsequently requests the suggested track ID in message 724 to server 80 queries database 90 for the track corresponding to the suggested track ID in message 726. In an alternative embodiment, the audio reply 728 including the audio data for the suggested track can include the referral link and the source ID value. Server 80 streams out the suggested track to the user in a series of packets 730A-D to the client. The client device application, upon request of the user for referral to the sales site, is configured to send disconnect message 732 that includes the User ID to server 80. Responsive to the disconnect message 732, server 80 is configured to log the duration of the play-out of the suggested track. When the user selects, for example, a purchase option through the user interface, the application of the client device is further configured to transfer the user to the sales site server by opening a new browser window and sending link request 738 to the sales server through the new browser window. The link request 738 includes the referral link, which is the URL value for the sales site, and the source ID value that corresponds to server 80. The application of the sales server is then configured to record the source ID for each link request in its records as is typically done in conventional devices today. Note that the original browser window maintains streaming of the audio data file and referral of the user need not interrupt by the audio service of the present invention.

Figure 16:
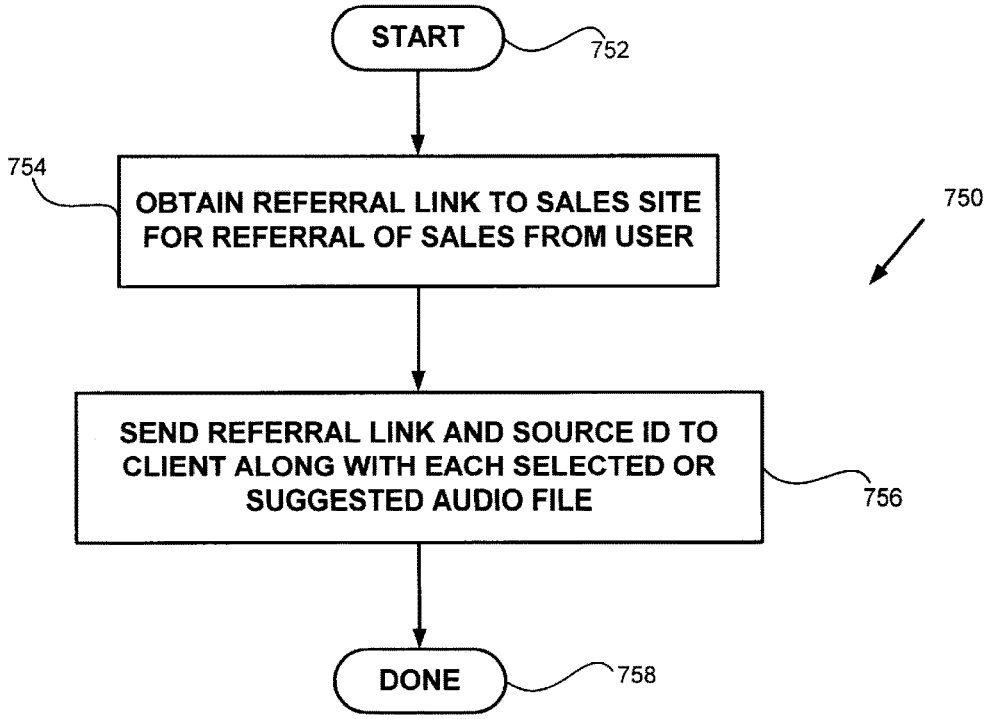
FIG. 16 is a control flow diagram illustrating an embodiment of a process executing at the server of FIG. 1 for sending a referral link to the client of FIG. 1.

FIG. 16 is a control flow diagram of process 750 according to the present invention for the server 80 according to the message exchange sequence 700 of FIG. 15. In process 750, server 80 obtains the referral link to the sales site for referral sales from the user, at step 754. As noted above, this referral link is obtained from the other file table of FIG. 4 stored in database 90. At step 356, server 80 sends the referral link, along with the source ID corresponding to the server 80, to the client device along with each selected or suggested audio file. It should be noted that this process can be used with audio files requested by the user and not only audio files suggested by server 80.

Figure 17:
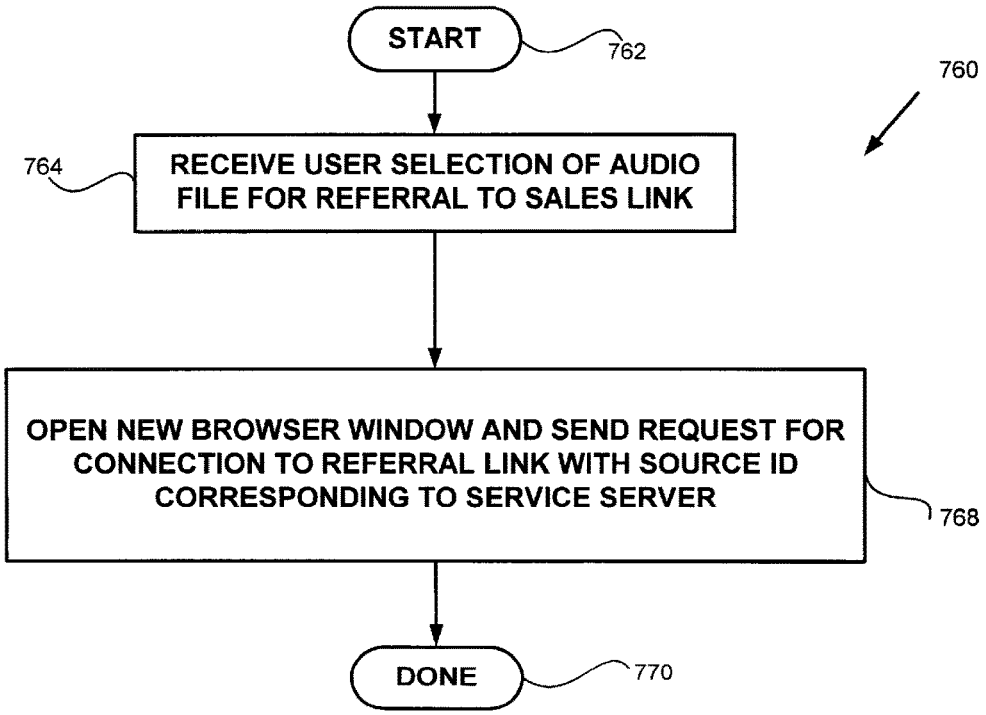
FIG. 17 is a control flow diagram illustrating an embodiment of the process according to the present invention in the client of FIG. 1 for referring a link to a sales site.

FIG. 17 shows a control flow diagram illustrating process 760 according to the present invention taking place in the client device. In process 760, the client device receives the user selection of an audio file for referral to a sales link at 764. The client device opens a new browser window at the user interface and, using the new window, sends the request for connection to the referral link URL value for connection to the sales site and includes a source ID corresponding to the service server 80 that referred the user to the sales site.

Figure 18:
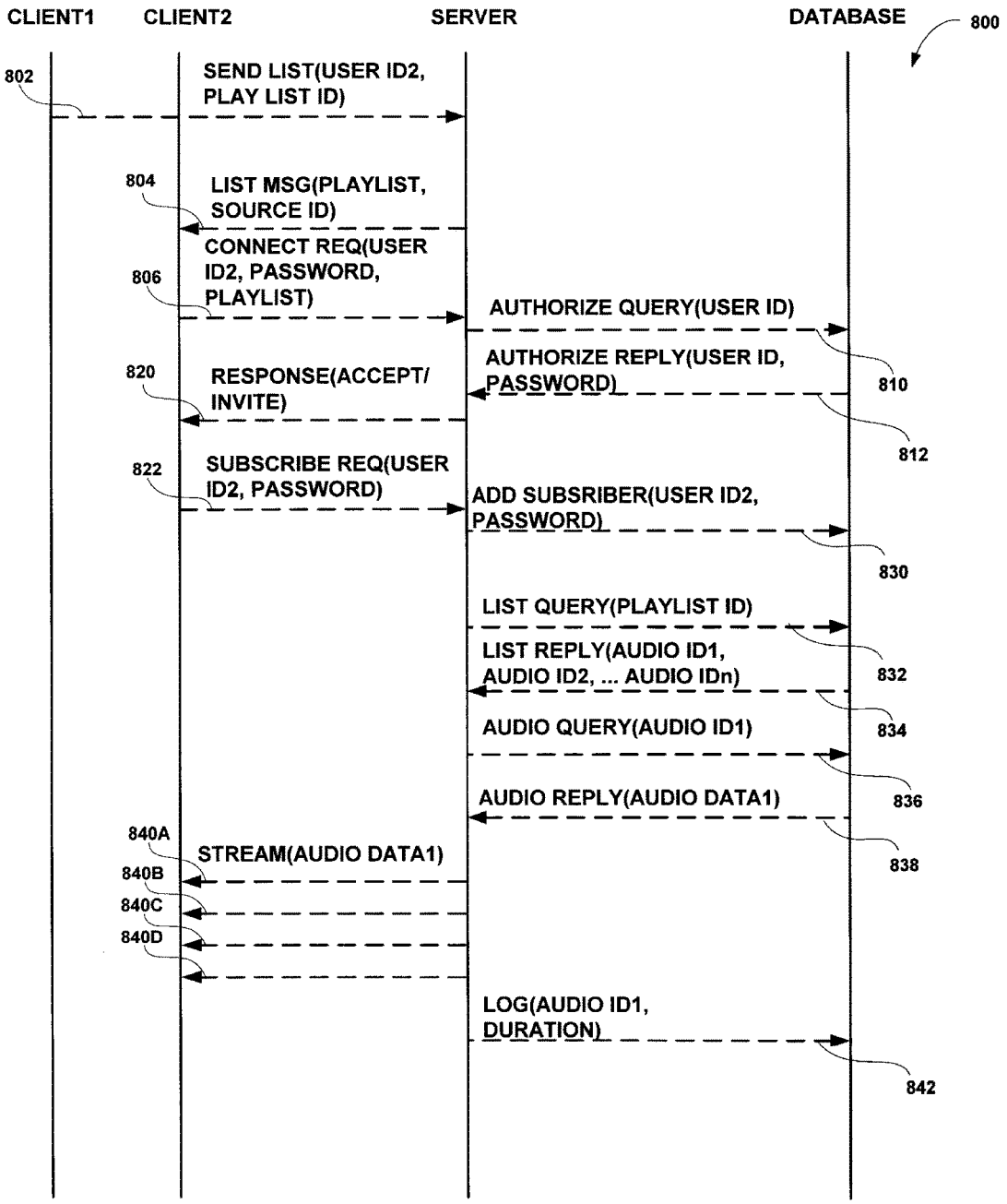
FIG. 18 is a message sequence diagram illustrating an embodiment of an exchange of messages in the architecture of FIG. 1 for sending an audio play list to another user.

FIG. 18 is a message sequence diagram of a sequence 800 according to the present invention for sending a play list to another user. In sequence 800, a first user at Client 1 sends a Send List message that includes an identifier value for another user User ID2, though this may also be a URL, network address, or domain name value for another user, and a Play List ID. Server 80 sends a List Message 804 to the second user at Client 2 that includes the Play List ID and a Source ID that identifies the server. The second user sends a connect request message 806 that includes the User ID2 and the Play List ID and may include a password value. The server responds to the connect request by attempting to validate the user through the sequence of authorize query 810 and authorize reply 812. The server then either accepts the connection request or, if the second user is not a subscriber to the service provided by server 80, sends an invitation indicator inviting the second user to subscribe to the service.

If the user is confirmed as a subscriber, then server 80 proceeds to play out the play list as described above. However, if the second user is not a subscriber, then the second user may send a subscribe request message 822 with the User ID2 and a password value along with, typically, billing information, such as credit card information, for payment of a subscription fee. Server 80 then adds an entry to the user data table of FIG. 2 for the second user. Play out of the play list sent by the first user then proceeds in a similar manner to that discussed above with respect to FIG. 7.

Figure 19:
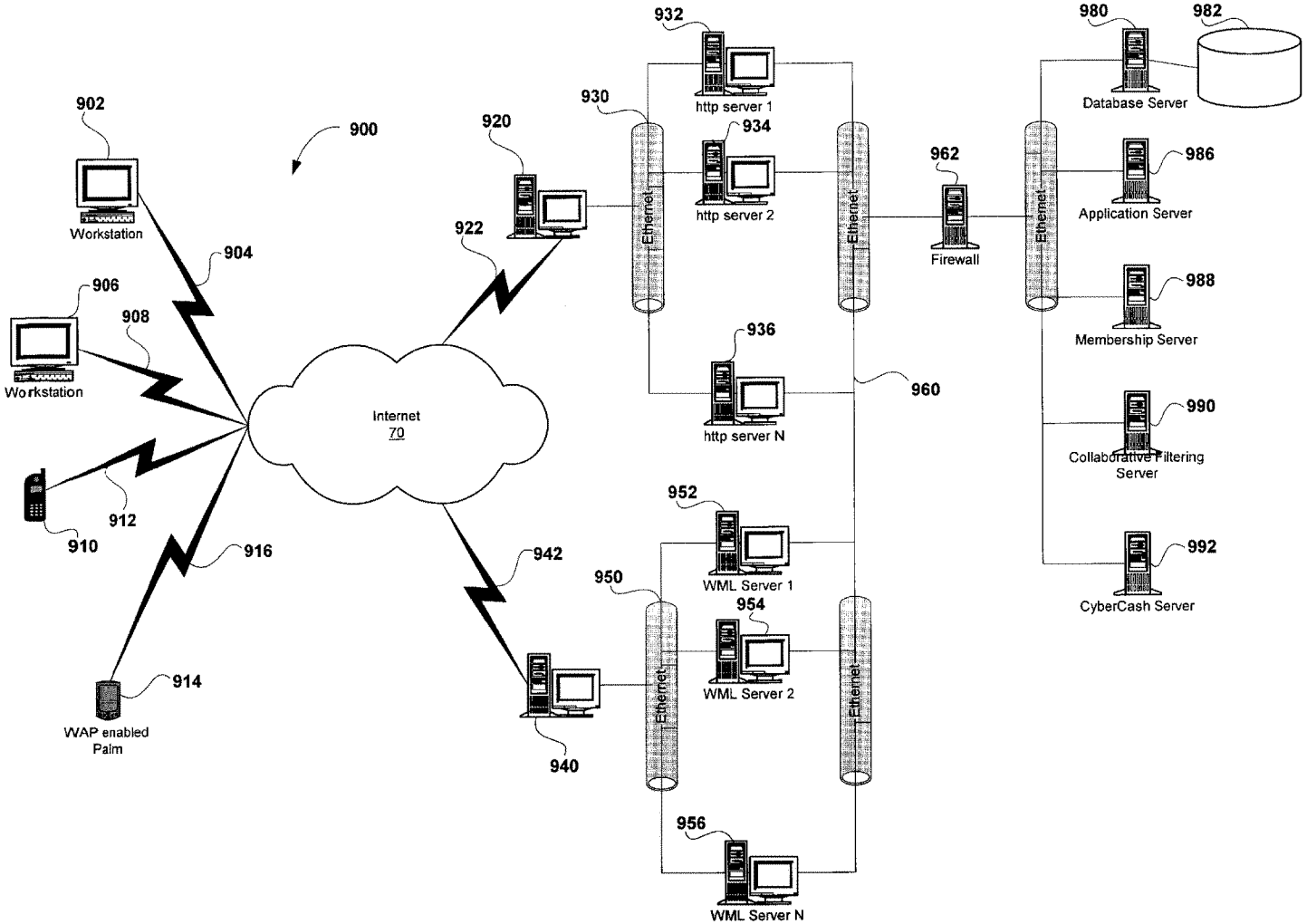
FIG. 19 is a functional block diagram illustrating another architecture suitable for application of the present invention.

FIG. 19 is a functional block diagram illustrating another example of an architecture 900 suitable for use according to the present invention. In architecture 900, a variety of additional examples of client devices are shown for interfacing with a user through network 70. In addition to workstation devices 902 and 906, a network enabled cellular telephone 910 and a Wireless Application Protocol (WAP) enabled personal information device 914 are connected to the network 70 through wireless communication links 912 and 914, respectively.

Server 80 of FIG. 1 is shown as a single server device. However, as one of ordinary skill in the art will readily appreciate, while the server may be composed of a single device performing the functions and processes according to the present invention, these functions and processes may be implemented in multiple devices, as shown in FIG. 19. In architecture 900, a cluster site is used to provide the service according to the present invention using a cluster site composed of multiple server devices. Communications between the network 70 and the cluster site are handled by network access servers 920 and 940. Network access server 920 is connected to HTTP servers 932, 934 and 936 to which server 920 is connected via local network 930. The HTTP servers are connected to function server 980, 986, 988, 990 and 992 through backend network 960, firewall device 962 and local network 970. Backend network 960 also connects streaming servers 952, 954 and 956 to the function servers through firewall 962 and local network 970. Cluster server 940 routes message traffic on the IP network 70 between wireless clients 910 and 914 and wireless markup Language (WML) servers 952, 954 and 956. See www.wapforum.org or www.xwap.com for further information regarding WAP and WML.

As one example, server 920 may receive an HTTP request from one of the client devices 902 and 906 via IP network 70 and distributes the request to one of the HTTP servers 932, 934, and 936. Similarly, server 940 may receive an HTTP request from one of the wireless client devices 910 and 914 via IP network 70 and distributes the request to one of the WML servers 952, 954, and 956. The HTTP or WML server processes the request, such as a user login or registration request, by accessing the various functional servers to obtain the data needed to service the request. For example, in response to a user login request, the server processing the request sends a query to membership server 988 that includes the user ID value from the user request. The membership server searches for user data corresponding to the user ID value, such as data from an entry in the user data table of FIG. 2, and returns the data in a reply to the HTTP or WML server servicing the request. The HTTP or WML server then formats and sends a reply to the client device from which the user sent the request.

If the user has not registered for a paid subscription to the service provided by the cluster in accordance with the present invention, then the HTTP or WML server may prompt the user to indicate whether the user wishes to register or upgrade to a paid subscription. If the user does wish to register for a paid subscription, then the HTTP or WML server collects billing information from the user and forwards it in a message to the CyberCash server 992, which, for example, validates the credit information and, through network connections to financial services, such as credit card companies or banks, makes the appropriate charges for the subscription service.

The HTTP or WML server similarly accesses the other functional servers to service the connection session with the client device. For instance, the HTTP or WML server may send a request with an Audio ID value to the database server 980 to obtain an audio data file from database 982, as discussed above. The HTTP or WML server may also send the logging information for the play-out to the database server 980 to record the audio play out. The application server 986 may be accessed by the HTTP or WML server to provide additional services to the user.

To obtain suggested audio files, the HTTP or WML server may send a request to the collaborative filtering server 990, which searches for audio files that may be of interest to the user based on the user's behavior and indicated preferences as well as data from other users. The collaborative filtering server 990 searches for audio files that may be of interest to the user using, for example, collaborative filtering algorithms, the algorithm discussed above with respect to FIGS. 12 and 13, or other algorithms based on the user's behavior. One of ordinary skill in the art will appreciate that a variety of approaches may be taken to identify files that are suitable candidates to suggest to the user.

Another embodiment of the service provided to a user according to the present invention is through automatic playlist creation of a user controllable mix of audio files. In automatic playlist creation, the user specifies the number of songs in the playlist and the percentage make-up by category. The playlist is created by the system based on the directions specified by the user. The user may then access the playlist in the manner described above.

An example of one scenario for automatic playlist creation starts when a user is prompted for the number of songs in the playlist. The user responds with a number (e.g. forty).

Figure 20:
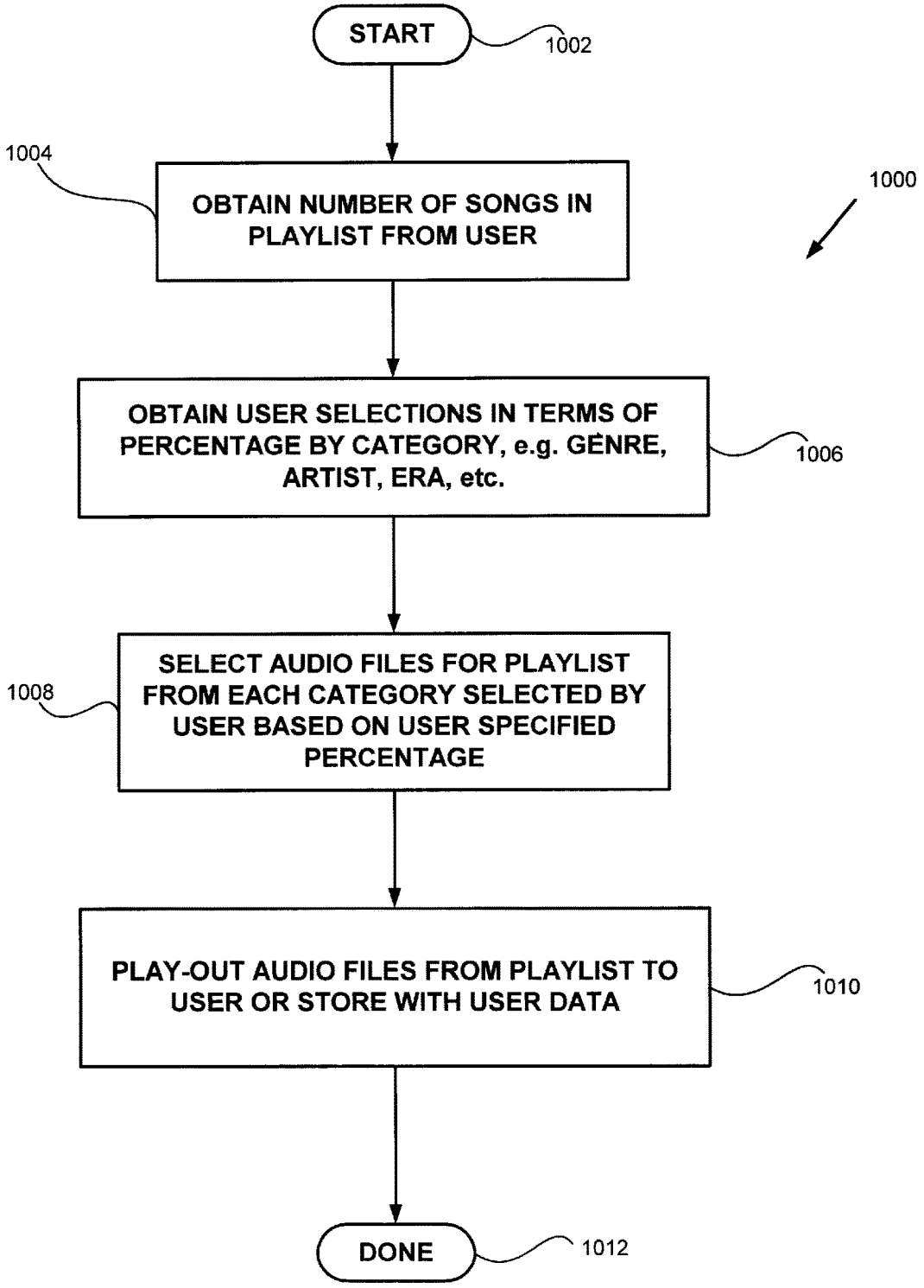
FIG. 20 is a control flow diagram illustrating an embodiment of a process for creating an automatic playlist for a user according to the present invention.

This is illustrated in step 1004 of FIG. 20, which is a flow control diagram illustrating one embodiment of an automatic playlist creation process according to the present invention. At step 1006, the user is prompted for the composition in terms of percentage by, for example, category, artist, era, etc., and the user responds with a series of percentages (e.g. 30% Jazz, 40% Blues, 30% Hip-Hop). At step 1008, the system builds a playlist with the specified number of songs (e.g. forty) and the requested percentages (e.g. twelve Jazz, sixteen Blues, and twelve Hip-Hop). The selection of the songs is done by the system based on the existing categories. At step 1010, the user may then access this playlist in the same manner as a user created playlist or store the playlist for subsequent access by the user. To store the automatically created playlist, the list of audio files may be linked to the user's entry in the user data table of FIG. 2.

Yet another embodiment of the service provided to a user according to the present invention is dynamic playlist creation. It may be desirable to the user to have continuous play-out of music without having to define a playlist or repeatedly select playlists that are limited in length. In dynamic playlist creation, the actual song selection is done "on the fly". In other words, selection of each song is done shortly before play-out of the song. For example, as play-out of a first song nears the end of the song, another song is selected for play-out once the first song ends. Dynamic play-list creation provides a high level of variability within user-selected preferences, but with a minimum demand for user administration. In other words, the user can define his preferences and the system will continuously select and play-out songs based on the user's preferences without further user input. Dynamic play-list creation may be thought of as a solution half way between a radio station, where the user has no control of which songs are played, and a user-specified playlist, where the user has exactly defined the songs that are played.

Figure 21:
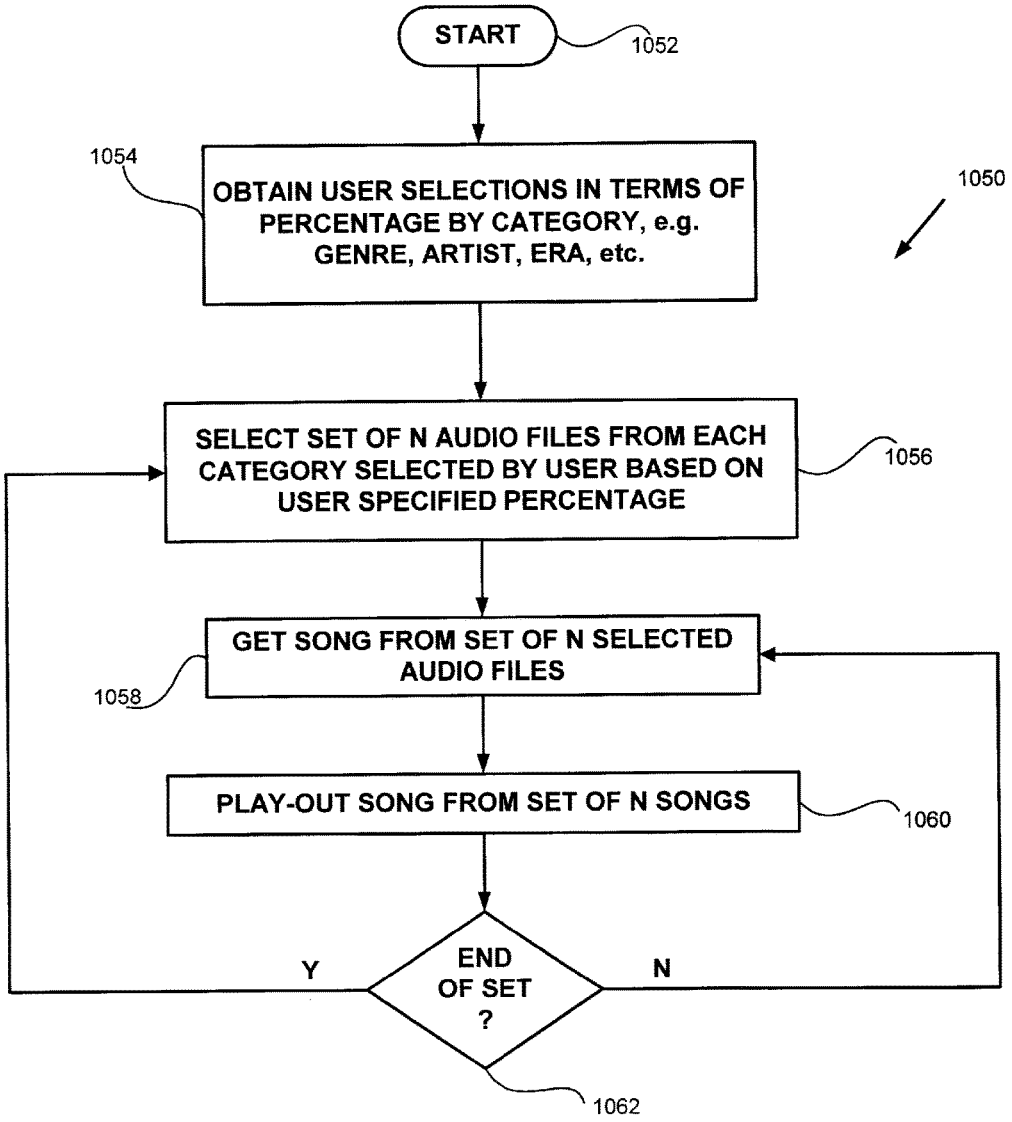
FIG. 21 is a control flow diagram illustrating an embodiment of a process for providing dynamic music selections for a user according to the present invention.

FIG. 21 is a control flow diagram illustrating one embodiment of a process 1050 for dynamic playlist creation according to the present invention. As in the case of the automatic playlist, the user selects the percentage make-up of the dynamic playlist by category type as well as the number of songs in the playlist. At step 1054, the user's preferences and percentages are obtained. At step 1056, a set of N audio files are selected by the system from the categories specified by the user and on the basis of the percentages obtained from the user. The selection process may be pseudo random within each category, a form of collaborative filtering, or a combination of these approaches and others.

Play-out of the songs from the set of N selected audio files begins at step 1058, where an unplayed song from the set is selected and the audio file retrieved. The audio file for the selected song is played-out at step 1060. Play-out from the set of N audio files continues until the set is exhausted, as reflected in the control flow branch at step 1062. While unplayed songs remain from the set of N, control flow branches back to step 1058. However, once the end of the set of N is reached, then control flow branches to step 1056 for selection of a new set of N audio files. By utilizing, at least in part, a pseudo-random selection process within the categories, the new set of N is likely to consist of different songs from the previous set. However, the selection process at step 1056 may be configured to select only unplayed songs or songs that have not been played within a predetermined period of time. One of ordinary skill in the art will readily appreciate that a large variety of approaches and combination of approaches may be employed in the selection process of step 1056.

By way of further example, assume that a user specifies the same choices as in the Automatic Playlist Creation scenario above. Assume that the user listens to the playlist for four hours during which eighty songs are played. The first forty songs will be selected by the system subject to the criteria specified by the user. The next forty songs will be selected by the same criteria, but given the dynamic nature of the list creation it is highly likely that different songs will be played while maintaining the composition percentage by category.

Generally, the service provided by the present invention is a subscription or paid service involving, for example, two levels of membership, paying and non-paying. The level of membership that a user chooses determines their access to functions and content in present invention. The paying membership requires the user to choose a payment schedule and specify a payment method. Users who choose not to register will be allowed to search for music and transact purchases but will only be allowed to listen to promotional albums.

Generally speaking, user actions, such as change in level of membership or viewing of user input windows or submittal of user input, do not interrupt the music playing. The system and method of the present invention may also permit users to rate the music currently being heard by the listener and the rating data collected and provided to the record companies and other clients interested in such data.

The system and method according to the present invention can be configured to allow the user to choose among a variety of play back modes, including normal, shuffle and loop. The play back modes may be based on algorithms based on user behavior, user input, collaborative filtering, or other approaches. Typically, a variety of user actions related will result in the system generating new suggestions or a new recommendation list for the user to review and choose. Examples of these user actions constituting user behavior for purposes of selection algorithms are selection or play out of a play list, selection or play out of an album, rating of a song, or buying an album. Results of user behavior based searching are displayed to the user via the user interface.

The user behavior based suggestion or recommendation algorithm may be integrated with a business based selection criterion as well. For example, the top-scoring album from the user behavior based recommendation algorithm may be showcased in a promotion window only when the production company for the album has paid for a timeslot for advertising or, conversely, is not displayed if another company has purchased the current timeslot.

An example of the user login exchange scenario in accordance with the present invention involves a user initially navigating to a web site configured to operate according to the present invention. For example, the user's HTML request may be received, processed and replies transmitted by the HTTP servers 932, 934 and 936 of FIG. 19 or WAP messages similarly handled by the WML servers 952, 954 and 956. The user is prompted for and enters a user ID and password. The user may then be presented with a personalized home page. Optionally, the user may be given a choice to have the web site remember the user ID and password values for subsequent logins. In subsequent logins, prompting of the user is bypassed and the user is taken directly to the personalized home page for users who have selected the option.

If the login attempt fails, i.e. if the user enters the wrong combination of user ID and password, then the user may be notified and prompted to types in a valid user ID and password. As another alternative, the user may be prompted to elect to have the correct password mailed to an email address of record for the user that is included in the user's data table entry or registration profile.

A different scenario may occur when a non-registered user navigates to the web site. For example, a registration page may be offered to the user or a registration page may be an option from the home page for the site. The user is presented with the privacy policy for the website along with copyright protection policy information or other types of information. The user may then be prompted to enter demographics information such as access location (e.g. work, home, home office, school), country, and postal code. The Access location and Country fields may be entered using a drop down with a list of predetermined choices.

In addition, the user enters personal information such as name, gender, date of birth, musical preferences by genre, user ID, password, password confirmation, and email address. The Gender and Musical preference fields may have drop down menus with a list of pre-populated choices. Other types of information requested may relate to income, profession or other data relevant for business demographics or for selection criteria.

The user submits the entered information to the website and the site server validates the entered values and commits the information to the database, thereby activating the login. The user data table of FIG. 2 is one embodiment of a storage format for this information.

If errors are discovered in the information entered by the user, then the user may be presented with a page or window that affords the user an opportunity to correct the information. For example, all errors that are found may be flagged for the user to correct with the date for all valid fields already filled in for the user so as not to require the user to unnecessarily reenter data. The server then revalidates the resubmitted information. This process may be repeated if additional errors are found. If the information is entered correctly, then the login may be activated.

If the user has requested a paying membership, then the same steps as just described may be applied except that the login is not activated until valid payment information is submitted. To validate payment information, for example, the user may be presented with a page over a secure connection that may be used to select a payment schedule and specify a credit card from which the website server, such as the CyberServer 992 of FIG. 19, withdraws the payments. The choice of payment schedule may be by week, month, year, etc. The cost for service may be generated from a backend database, such as using user access information stored as described above with respect to FIGS. 5 and 6. The website validates the credit card information and activates the login. The website may also submit a request to debit the account by the schedule chosen.

If errors are discovered in the payment information by the website server, then the user may be presented with a page or window that affords an opportunity to correct the information. For example, all errors found may be flagged for the user to correct and all valid fields filled in for the user so as not to require the user to unnecessarily reenter data. The website, or a particular server of the website, then revalidates the resubmitted information. If additional errors are found, then this process may be repeated. Otherwise the user's login is activated, such as by setting the Subscribed column for the user's entry in the table of FIG. 2 to Yes.

Along similar lines, a user may upgrade from a non-paying membership or subscription to paying status in order to obtain full privileges, e.g. ability to download audio files in their entirety, customized play-lists, etc., from the website. The user would be offered a page or would select a page that permits entry and validation of payment information as described above.

Conversely, a user may downgrade from paying to non-paying membership through user selection or through invalidation of the payment information, e.g. expired or invalid credit card. In this case, for example, the Subscribed column for the user's entry in the table of FIG. 2 is set to No and the user is denied the privileges afforded to paying users. Some of the user's information, such as playlists and demographic information may be preserved for a period of time in the expectation that the account may be once again upgraded to paying status and access to full privileges restored.

The website may also provide an interface through which the user may view and update account information. For example, the user may select a different credit card for the charges. If the charges for the service are configured to accrue on an a-la-carte basis, e.g. billed based on total time of download or total selections, then the interface may provide the user with the opportunity to review such charges.

An embodiment of the user interface for the music search function of the present invention may be provided as a page or window from the server site, e.g. website or wireless application server. After the user has navigated to the site and logged in, the user types a full or partial name of artist or song, or album, for example, into a search window. The server site receives and processes the search and returns the search results in, for example, a scrollable window where each result is a separate clickable, e.g. selectable, item. If an item is chosen, a feature area of the page from the server is populated with, for example, an icon for the album, liner notes, or an option to buy the album. If the user is a paying member, the user may also be presented with an option to listen to the song or album, depending on the search. A non-paying member or a non-registered user may be presented with an option to view the contents of the album or may be permitted to stream out just a sample portion of the song.

An embodiment of the user interface for the music suggestion or recommendation function of the present invention may also be provided as a page or window from the server site, e.g. website or wireless application server. After the user logs onto the server site, the user is offered or may select the suggestion function through the site home page. The server site processes the user's request and returns a set of albums or songs influenced by the user's information, such as behavior or demographics. For example, the criteria used may include a song currently selected by the user, a song recently added to a user's personal playlist, a recently purchase song or album, the songs found in the user's personal playlists, or the demographic information provided by the user. The server, or a server residing at the server site, will use a suggestion algorithm, such as collaborative filtering, to create the recommendation list. The server site may return the search results to the user interface in the form of a scrollable window, where each result is a separate clickable item. If an item is chosen, the feature area may be populated with the album icon, liner notes, or an option to buy or listen to the album.

As mentioned briefly above, the user interface may include a promotional area where songs or albums are displayed to the user in the form, for example, of an icon simulating an album cover and may include names of the songs on the album, liner notes, etc. The user may elect to stream the song or album for listening. The feature area may also include a link for purchasing the song or album.

If a user selecting a song or album for playout does not have a audio streaming application in his client device, then the server site may provide a link through the user interface to a website or other network resource where the user can download a streaming application.

The user interface provided to the user by the server site may also include a window for displaying search results, suggestion results, user defined playlists, service provide defined playlists, or other sources. This window will list the songs from the suggestion list, playlist, etc. and may include graphical icons representing each song, liner notes, or similar information. This information may, for example, be linked to an entry for an audio file in the audio data table of FIG. 4. The display window may also include a link for purchasing each song or album. If the list consists of albums, for instance, the user may be able to click on the icon for the album in order to obtain a display of the list of songs on the album. The user interface may also be configured to permit the user to link from a song to an album containing the song.

As noted above, the user interface may be configured to link the user to a website or network resource where a song or album may be purchased. An example of the user interface to purchase an album provides a link to a sales partner's site. If the user selects this link, a new browser window is opened and linked to the sales partner's site where the user can purchase the album. The process of linking to the partner's site need not disrupt the streaming of the audio file to the user. The sale of the album to the user is completed through the partner's site.

Similarly, for individual songs, the user interface may be configured to offer purchase of the song track or album. If the user selects purchase of the track, the user may be referred to a sales partner's site that provides for download of individual song tracks. The process of purchasing the track need not disrupt streaming of the audio file and the sale of the downloaded track may be completed through the partner's site. Alternatively, sale of the downloaded track may be completed through the server site according to the present invention with suitable adaptation.

Custom compilations of songs, such as the list of songs on a playlist, may be purchased in a manner similar to that for albums or individual songs.

With regard to customized playlists, the user interface may, for example, provide a window or input area of a page that permits the user to create, modify or delete playlists. The user will be prompted for a name of a playlist. If the playlist name is new, then no matching playlist for the user will be found and the user will be prompted to identify the songs to add to the playlist. This may be through a search or suggestion window, pull-down menu, etc. If there is a matching playlist, then the contents of the playlist will be displayed to the user for editing. The new or edited playlist is then stored by, for example, linking it to the user's entry in the user data table of FIG. 2.

The playlist window may also include a selection to email the list to a friend. The user will be prompted to identify the playlist and the email address for the friend. The server site will then send the playlist, including, for example, the title of each song in the list, to the email address provided. The email to the friend may include a link, e.g. a FURL, to the server site along with an invitation to subscribe to the service described herein, if the friend is not already a registered user. Also, the link provided to the friend may automatically log the friend in, if the friend is already a registered user. The friend may be offered the option to save the playlist.

The user interface may also be configured to permit a user to navigate through to a help page or similar information regarding the service without disrupting the streaming of an audio file.

In addition, the user interface may include advertising, such as banner ads. These ads may be selected on the basis of timeslots purchased by an advertiser, user demographics, or based on the user's behavior, e.g. music currently selected or selected in the past. The banner ad may include a link to the advertiser's website that, when activated, opens a new browser window on the user interface for the user to access the advertiser's site without interrupting current streaming activity.

The server site may allow the scheduling of several types of advertising customers, such as banner and album promotion. The advertisers typically do not gain direct access to the scheduling systems but rather give their information to the server site operational staff that places the order. The banner advertising may be outsourced to an Internet advertising solutions company such as Doubleclick. Banner advertising scheduling process may also be a manual process. Banner targeting may be achieved through tags identifying the user demographic and music currently being played. Album promotion scheduling as well as selection may be similarly handled.

Banner ad scheduling may be performed according to parameters specified by the ad solutions partner for each customer, such as duration, total hits, demographic targeting, type of music currently streaming, or pricing extended. Runtime selection of banner ads by the server site may require the submission of tags for each of the fields used to schedule the ads. Bimonthly promotion hit reports may be made available to server site personnel in order to bill the customer or may be used to automatically bill the customer.

The album promotion scheduling may be based on one half hour increments for the entire membership. The following parameters may be specified at the time of scheduling: duration, total hits, one half hour time slot during which to show the album, or pricing extended. Bimonthly banner hit or promotion reports may be run to generate billing invoices or data. These reports may contain the following information: total views per album, total detail view clicks per album, total buy clicks per album, or invoice amount.

The server site may provide for program (music) scheduling operations personnel to manipulate the music content and presentation of the site in a variety of ways, such as albums a nd pre-programmed play lists. These operations may be supported through an operational access through a server site intranet.

To add a new album, operations personnel may log into a content maintenance intranet web site. The operator may choose an add album link. The operator then specifies the album information, such as the album gif or icon, liner notes, song list, genre, or artist information. For each song on the album, the operator may specie a path to an encoded file, such as an audio file, containing the song. The operator may then commit the record for the new audio file, which results, for example, in a new entry in the audio data table of FIG. 4. The album or song is then available for user access through the server site. The operator may similarly delete and album or song, which may result, for example, in an entry being removed from the audio data table of FIG. 4. Removing a file may also result in a notification being sent to user affected by the deletion, such as, for example, users having the deleted audio file listed in a custom playlist.

The operator may likewise administer a pre-programmed play list through an intranet website or similar administrative interface. The operator chooses an option to create a new pre-programmed play list. The operator then enters a playlist name and searches for songs and albums to add to the newly created play list. The operator then commits the record of the newly created play list and the server site makes the list available to users. Pre-programmed playlists may be deleted in a s similar manner.

In one embodiment, the user interface creates the appearance that it is an application that changes parts of the user interface page as it is interacted with. The user interface may promote usability by dividing the browser real estate into readily recognized functions that are reused throughout the application. An exception to this appearance to the user is when detailed user input is required by any of the supported functions. Then a new page may be presented for the user to input the required data. The user interface design may be implemented in a thin client architecture where no client side components are utilized, e.g. the browser application for the user resides on an applications server at the server site, such as application server 986 of FIG. 19, and scripting is kept to a minimum.

An example of the user interface is a function aggregate page that refers to a group of intuitively related functions that maintain the illusion of a unified page or screen, but are, in reality, supported through many separate web pages. The user interface may contain the following function aggregate pages: a Home Page, a User Registration and Profile Maintenance, Music Listening/Searching as part of a Personalized home page, Music Purchase, help and frequently-asked-questions (FAQ) page. Each page listed above is typically a logical page and not a physical page and may be divided up functionally depending on the desired design.

Within these pages, functional areas may be reused. The consistent use of screen real estate tends to promote site predictability and usability. Not all of these elements need to be utilized in every function aggregate page. For example, there are a number of reusable functional areas. For instance, banner advertising, where an advertising solutions company, such as Doubleclick, may serve the banner advertising. Also, demographics data may be used to segment the target audience. Further, navigation links to FAQ may be composed of a user clickable visual element that presents the FAQ page and frequently appears as an option for the user.

For album promotion, an album visual, as well as liner notes, may be presented to the user. Examples of an algorithm for selection are described above. A user clickable link may lead the user to a purchase screen or initiate the playing of a selected song from the album. The decision to offer a music play option link may be contingent upon user registration.

For music search, the search functional area may support several functions. First, it may allow the user to search by several types of keys, e.g. artist, song, and album. The user is free to type in any phrase and the system will perform a like key match by the three criterions. All matched albums will, for example, be returned in a separate scrollable area. Each item returned may include the artist name followed by the album name.

For music recommendation or suggestion, the recommendation list may be a passive user experience in that the server site constantly evaluates and modifies the list as the user interacts with the site.

Examples of functionality supported directly by the home page include user login, music search, music play from feature window of promotional album, navigate to banner, and navigate to FAQ. Example of functionality supported through a link from this page are: registration—nonpaying, registration—paying, album purchase, and song purchase.

The membership level a user chooses may determine his access to functions and content in Amelody. As noted above, there may be two membership levels, paying and non-paying. Both types of memberships ask for basic registration information. The paying membership also typically requires the user to choose a payment schedule and specify a payment method. The non-paying member may be able to listen to promotional albums and certain pre-programmed play lists provided by the server site. Users who choose not to register may be allowed to browse the site and transact purchases, but may not be able to listen to any content. Examples of functionality supported through a user registration and profile maintenance page or pages are registration—non-paying, registration—paying, change of membership from non-paying to paying, change of membership from paying to non-paying, view/update account information, view/update registration information, navigate to banner, and navigate to FAQ.

Examples of functionality directed supported by an embodiment of a music listening/searching page, such as one offered through a personalized home page, include music search, user requested recommendation, music play from feature window of promotional album, Music play from feature window of search result, music play from playlist, music play from pre-programmed playlist, switching play from playlist to album, switching play from album to playlist, playlist creation, playlist deletion, playlist edit, playlist email send, playlist email acceptance, navigate to banner, and navigate to FAQ. Examples of functionality supported through a link from such a page are: change of membership from non-paying to paying, change of membership from paying to non-paying, view/update account information, view/update registration information, album purchase, song purchase, and custom compile list purchase.

A music purchase page may be offered to the user to allow the user to buy music through the server site or through sales partners or fulfillment affiliates. The user's registration status may determine the level of access by the user to the functionality provided by such a page. Example of the functionality provided by this page include album purchase, song purchase, and custom compile list purchase.

The capacity of the server site may be measured in the number of simultaneous supported users both by a web site and by a streaming server. Given that a typical personal computer class web server, application server, and streaming server is capable of handling hundreds of simultaneous users, the server site may be architected in a way that permits a hosting provider to configure the server system to meet a particular sizing requirement and that the architecture does not, within reason, set a capacity upper limit. A preferred system design and architecture will allow the hosting provider to design the appropriate server capacity, bandwidth into individual servers, as well as network and try. load balancing architecture that sizes the total server site user capacity.

As noted above, one aspect of the present invention is to recommend music that the user finds useful. This function may be provided in a recommendation or suggestion engine. The job of the recommendation engine is to predict what new music a user might like to hear at a given moment. New music includes not only new releases but also music that the user has not heard or been recommended before. The engine may consider a variety of factors in creating a recommendation. Examples of these factors may include: User stated genre preference at registration, History of music listening access that profiles actual listening behavior (Songs listened to), History of music management access that profiles actual playlist contents (Songs contained in personalized playlist), Current musical access context, Current song being played, Rating of a newly heard song, Selection of a promotional album for listening, and Purchase of an album or a song.

Initially when a new user logs in, the server site may rely solely on the user stated genre preference to choose a set of albums to recommend to the user. As the user makes selections and, through user behavior, compiles a history of use, a compiled profile based recommendation may be generated. Profiling of music listening and music management may be done using a variety of criteria over time. Examples of criteria and categories are era (e.g. 60's, 70's, Baroque), genre (e.g. Rock, Blues, Hip hop), artist, or producer.

Each factor may be counted over time slices or samples where the relative importance of each time slice is assigned, for example, through a logarithmic step algorithm that decays as the time slice moves away from the current time. The total area captured by the algorithm may provide a data point for that dimension, category item (e.g. music listening access, Rock). The following list offers examples of combinations of factors and criteria that may be used to derive suggestions. Note that not all of the following examples will be relevant for each user. The list includes:

Music listening, instances of Era+Music in playlist, same instances of Era,

Music listening, instances of Genre+Music in playlist, same instances of Genre,

Music listening, instances of Artist+Music in playlist, same instances of Artist, and Music listening, instances of Producer+Music in playlist, same instances of Producer.

This approach may be useful to track the user's musical tastes over time giving more importance to recent behavior yet still taking into consideration older data points.

Each album in the server site catalogue, e.g. stored on the server site, may be assigned a value in one or more of the four categories mentioned above. A sorting algorithm may be applied over the server site catalogue for each user, taking into consideration how well each album ranks against the compiled profile. Emphasis of category in this ranking may be based, for example, on the following order: Artist, Producer, Genre, and Era.

The list generated from the application of this sort may form the basis for a recommendation. A system configurable parameter may also be used to determine a ranking cut-off "score" below which the albums are excluded from the recommendation list. The server site may choose a set number of albums from this list to recommend.

A system configurable parameter may also be used to trigger a periodic ranking sort for each user. A system configurable threshold of profile data points may be used to trigger the use of a recommendation method over the stated preference recommendation method for a user.

Current musical access based recommendations may be based on user interactions involving a particular album or song during the current session and may be used to generate a recommendation list utilizing a real-time collaborative filtering engine such as Net Perceptions Group Lens, or Andromedia's Like Minds. Examples of user actions that may trigger this recommendation approach may include: choosing a song to play, start of next song in the play list, positive rating of a newly heard song, selection of a promotional album for listening, and purchase of an album or a song.

User payment processing may be handled through a service such as CyberCash. Transactions may be submitted to the service immediately after the service once the service to the user is turned on or off or immediately following the user requests. The rate schedules applied to the users may be database driven. Cancellation of the service may result in a pro-rated refund of the current subscription fee.

It should be understood that the programs, processes, methods, systems and apparatus described herein are not related or limited to any particular type of computer apparatus (hardware or software), unless indicated otherwise. Various types of general purpose or specialized computer apparatus may be used along with the present invention to perform operations in accordance with the teachings described herein.

In view of the wide variety of embodiments to which the principles of the invention can be applied, it should be understood that the illustrated embodiments are exemplary only, and should not be taken as limiting the scope of the present invention. For example, variations may be made in the message flow scenarios other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

[1. A method for providing audio service through a communication network to a user, the method comprising the steps of:

registering the user for the audio service;

storing a User identifier value for the user responsive to registering the user for the audio service;

receiving a request message through the communication network, the request message including a network address value, a User identifier value and an audio identifier value;

searching for a matching stored user name value that matches the user name value from the request message;

when no matching stored user name value is found, rejecting the request message;

when the matching stored user name value is found, searching for an audio file corresponding to the audio identifier value of the request message; and when the corresponding audio file is found, streaming the audio file over the communication network to the network address.]

[2. The method of claim 1, the method further including the step of incrementing a play-out count of the streamed audio file.]

[3. The method of claim 2, the method further including the step of allocating payment to an owner of the streamed audio filed based on the value of the play-out count.]

[4. The method of claim 2, the method further including the step of generating play-out statistics for audio files based on the play-out count for each audio file.]

[5. The method of claim 1, the method further including the step of recording a duration of play-out of the streamed audio file.]

[6. The method of claim 5, the method further including the step of allocating payment to an owner of the streamed audio filed based on a total duration of play-out of the streamed audio file.]

[7. The method of claim 5, the method further including the step of generating play-out statistics for audio files based on the play-out duration value for each audio file.]

[8. The method of claim 7, where the method further includes the step of collecting demographic data for each user and the step of generating play-out statistics for audio files based on the play-out duration value for each audio file includes relating the play-out statistic for each audio file to the demographic data for each user that has played-out each audio file.]

[9. The method of claim 1, the method further including the steps of:

storing a play list for the user, where the play list includes a plurality audio identifier values;

receiving a play list request message;

responsive to the play list request message, retrieving the play list for the user and transmitting the play list to the user over the communication network; and streaming out an audio file corresponding to one of the plurality of audio identifier values from the play list.]

[10. The method of claim 9, further including the step of sending the play list to another user.]

[11. The method of claim 10, further including the steps of:

receiving a request with the play list from the another user;

validating the another user;

when the another user is validated as having subscribed, playing out the play list to the another user; and when the another user is not validated as having subscribed, sending a message to the another user inviting the another user to subscribe.]

[12. The method of claim 1, the method further including the steps of:

storing a referral link for each audio file, where the referral link corresponds to a sales site accessible through the communication network;

outputting the referral link with the streamed audio file;

responsive to a user request for the referral link, transferring the user to the sales site; and incrementing a referral count for the referral link.]

[13. The method of claim 12, the method further including the step of billing an owner of the sales site based on the value of the referral count for the referral link.]

[14. The method of claim 1, the method further including the steps of:

tracking the audio identifier values for a set of user requests;

matching the audio identifier values for the set of user requests with a predetermined set of categories to determine at least one user category;

selecting at least one unselected audio identifier from the user category that has not been requested by the user; and sending the unselected audio identifier to the user.]

[15. The method of claim 14, where the predetermined set of categories includes at least one of a music genre, a music era, and an artist.]

[16. The method of claim 1, where the method further includes the steps of:

comparing the audio identifier values for the set of user requests with a pattern of user requests for each of a plurality of other users in order to find a similar pattern of user requests from another user;

selecting at least one unselected audio identifier from audio identifier values selected by the another user that has not been requested by the user; and sending the unselected audio identifier to the user.]

[17. The method of claim 1, the method further including the steps of:

obtaining a selection of categories from the user along with a selected proportion for each category of the selection; and selecting a set of audio identifier values from the selection of categories based on the selected proportions.]

[18. The method of claim 17, the method further including the step of storing the set of audio identifier values as another user accessible play list.]

[19. The method of claim 17, where the proportion for each category of the selection is expressed as a percentage.]

[20. The method of claim 1, the method further including the steps of:

obtaining a selection of categories from the user along with a selected proportion for each category of the selection;

selecting a set of audio identifier values from the selection of categories based on the selected proportions; and playing out to the user each of the audio files corresponding to the set of audio identifier values.]

[21. The method of claim 20, the method further including the steps of:

detecting that each audio file corresponding to the set of audio identifier values has been played out to the user;

selecting another set of audio identifier values from the selection of categories based on the selected proportions; and playing out to the user each of the audio files corresponding to the another set of audio identifier values.]

*22. A method, comprising:*

*receiving, at a computer system, a request from a first user of a music streaming service to send a playlist of music files to a second user of the music streaming service, wherein the playlist was previously created by the first user;*

*in response to receiving the request from the first user, sending, by the computer system, a message identifying the playlist to the second user;*

*receiving, at the computer system, a request from the second user to begin streaming at least a portion of the playlist;*

*in response to receiving the request from the second user, streaming, by the computer system, one or more of the music files included in the playlist to the second user;*

*storing, by the computer system, play-out information indicative of an amount of the streaming of the music files in the playlist to the second user, wherein the storing includes inserting records into a table of streamed music files, wherein the records include a first record specifying, for a particular one of the music files in the playlist streamed to the second user, 1) a pointer to the particular music file, 2) a duration of play-out of the particular music file streamed to the second user, and 3) an owner identifier indicating an owner of the particular music file to receive payment; and*

*based on the play-out information, allocating, by the computer system, payments for owners of the music files in the playlist that have been streamed to the second user, wherein the allocating includes determining a total duration of play-out of the particular music file based on a plurality of durations of play-out of the particular music file included in the table.*

*23. The method of claim 22, wherein the request from the first user includes information identifying the second user.*

*24. The method of claim 22, further comprising:*

*receiving, by the computer system, an access request from the second user to access the music streaming service; and*

*in response to determining that the second user is a registered user of the music streaming service, granting, by the computer system, the second user access to the music streaming service.*

*25. The method of claim 24, wherein the access request from the second user includes:*

*the request to begin streaming the music files included in the playlist; and*

*a password.*

*26. The method of claim 22, further comprising:*

*receiving, by the computer system, an access request from the second user to access the music streaming service; and*

*in response to determining that the second user is not a registered user of the music streaming service, sending, by the computer system, a message inviting the second user to register with the music streaming service.*

*27. The method of claim 26, further comprising:*

*receiving, by the computer system, a registration request message from the second user, wherein the registration request message includes billing information.*

*28. The method of claim 22, wherein the message sent to the second user includes an invitation to the second user to register with the music streaming service.*

*29. The method of claim 22, further comprising:*

*storing, by the computer system, music files and playlists previously created by a plurality of users of the music streaming service, wherein each of the playlists is associated with one or more of the stored music files.*

*30. The method of claim 22, further comprising:*

*in response to determining that the second user is a registered user, sending, by the computer system, a link that is configured to grant the second user access to the music streaming service.*

*31. The method of claim 22, further comprising:*

*subsequent to streaming a music file included in the playlist to the second user, receiving, by the computer system, a request from the second user to add the streamed music file to a playlist created by the second user.*

*32. The method of claim 22, wherein the playlist was previously created by the first user from a set of audio files stored by the computer system.*

*33. The method of claim 22, wherein the playlist was previously created by the first user for the first user.*

*34. The method of claim 22, wherein the play-out information specifies, for a particular one of the music files in the playlist streamed to the second user, a count value indicating a number of times the particular music file has been streamed to the second user.*

*35. A computer system, comprising:*

*a storage unit configured to store:*

*a plurality of music files, and*

*a plurality of playlists respectively associated with one or more music files of the plurality of music files, the plurality of playlists having been created based on information received from users of a music streaming service; and*

*a processing unit configured to:*

*receive a request from a first user of the music streaming service to send, to a second user of the music streaming service via a public network, information relating to a first playlist of the plurality of playlists, wherein the first playlist was previously created by the first user;*

*in response to receiving the request from the first user, send a message identifying the first playlist to the second user;*

*in response to receiving a request from the second user to begin streaming from the first playlist, stream one or more of the music files included in the first playlist to the second user;*

*maintain, in a table of streamed music files, play-out information indicative of an amount of the streaming of the music files in the first playlist to the second user, wherein maintaining the play-out information includes inserting one or more records for a particular one of the music files in the playlist streamed to the second user, wherein the one or more records identify the particular music file and include one or more durations of play-out of the particular music file streamed to users and an owner identifier indicating an owner of the particular music file to receive payment; and*

*allocate, based on the play-out information, payments for owners of the music files in the first playlist that have been streamed to the second user, wherein allocating a payment to the owner includes determining, from the table, a total duration of play-out of the particular music file based on a plurality of durations of play-out.*

*36. The computer system of claim 35, wherein the processing unit is further configured to:*

*receive a request from the second user to access the music streaming service; and*

*in response to determining that the second user is a registered user of the music streaming service, grant the second user access to the music streaming service.*

*37. The computer system of claim 36, wherein the request from the second user to access the music streaming service includes:*

*information identifying the first playlist; and*

*information identifying the one or more of the music files included in the first playlist.*

*38. The computer system of claim 35, wherein the message identifying the first playlist to the second user includes an invitation to the second user to register with the music streaming service.*

*39. A non-transitory computer-readable medium having instructions stored thereon that, responsive to execution by a computer system, cause the computer system to perform operations comprising:*

*receiving a request, via a public network, from a first user of a music streaming service to send a playlist of music files to a second user of the music streaming service;*

*in response to receiving the request from the first user, sending a message to the second user, the message including information identifying at least one of a plurality of music files included in the playlist;*

*receiving a request from the second user to begin streaming at least a portion of the playlist;*

*in response to receiving the request from the second user, streaming one or more of the plurality of music files included in the playlist to the second user;*

*storing, in a table, play-out information indicative of an amount of the streaming of the music files in the playlist to the second user, wherein the storing includes inserting, into the table, a first record for a particular one of the music files in the playlist streamed to the second*

*user, wherein the first record includes an identifier of the particular music file, a duration of play-out of the particular music, and an owner identifier indicating an owner to receive payment for the particular music file; and*

*using the play-out information to allocate payments for owners of the music files in the playlist that have been streamed to the second user, wherein the using includes determining a play-out time of the particular music file based on a plurality of durations of the play-out of the particular music file as indicated in the table.*

*40. The non-transitory computer-readable medium of claim 39, further comprising:*

*receiving an access request from the second user to access the music streaming service; and*

*in response to determining that the second user is a registered user of the music streaming service, granting the second user access to the music streaming service.*

*41. The non-transitory computer-readable medium of claim 39, further comprising:*

*receiving an access request from the second user to access the music streaming service; and*

*in response to determining that the second user is not a registered user of the music streaming service, sending a message inviting the second user to register with the music streaming service.*

*42. The non-transitory computer-readable medium of claim 39, wherein the message sent to the second user further includes information for registering with the music streaming service.*

*43. The non-transitory computer-readable medium of claim 39, further comprising:*

*in response to determining that the second user is a registered user of the music streaming service, sending a link that is configured to allow the second user to access to the music streaming service.*

*44. The non-transitory computer-readable medium of claim 39, further comprising:*

*subsequent to streaming a music file included in the playlist to the second user, receiving a request from the second user to add the streamed music file to a playlist created by the second user.*

* * * * *